(12) United States Patent
Kumagai et al.

(10) Patent No.: US 11,718,387 B2
(45) Date of Patent: Aug. 8, 2023

(54) PROPELLANT FORCE GENERATOR

(71) Applicant: NSK LTD., Tokyo (JP)

(72) Inventors: Hiroyasu Kumagai, Fujisawa (JP); Daisuke Gunji, Fujisawa (JP)

(73) Assignee: NSK LTD.

( * ) Notice: Subject to any disclaimer, the term of this patent is extended or adjusted under 35 U.S.C. 154(b) by 0 days.

(21) Appl. No.: 17/606,791

(22) PCT Filed: Mar. 17, 2021

(86) PCT No.: PCT/JP2021/010917
§ 371 (c)(1),
(2) Date: Oct. 27, 2021

(87) PCT Pub. No.: WO2021/187541
PCT Pub. Date: Sep. 23, 2021

(65) Prior Publication Data
US 2022/0411045 A1    Dec. 29, 2022

(30) Foreign Application Priority Data
Mar. 17, 2020  (JP) ................. 2020-047046
Mar. 17, 2021  (JP) ................. 2021-043982

(51) Int. Cl.
*B64C 11/44* (2006.01)
(52) U.S. Cl.
CPC .................... *B64C 11/44* (2013.01)
(58) Field of Classification Search
CPC ....................................................... B64C 11/44
See application file for complete search history.

(56) References Cited

U.S. PATENT DOCUMENTS

| 2011/0163199 A1 | 7/2011 | Cardozo |
| 2015/0015104 A1 | 1/2015 | Kataoka et al. |
| 2016/0167777 A1 | 6/2016 | Podgurski |

FOREIGN PATENT DOCUMENTS

| CA | 2740475 A1 * | 11/2011 | ............... F01D 7/00 |
| JP | H05-87037 A | 4/1993 | |

(Continued)

OTHER PUBLICATIONS

International Search Report (English and Japanese) of the International Searching Authority issued in PCT/JP2021/010917, dated May 25, 2021; ISA/JP (5 pages).

*Primary Examiner* — Sabbir Hasan
(74) *Attorney, Agent, or Firm* — Harness, Dickey & Pierce, P.L.C.

(57) ABSTRACT

A propellant force generator is provided having the size in the axial direction of a rotational shaft of a motor reduced while making the pitch angles of rotational blades driven by the motor variable. The propellant force generator includes a propellant-force generating motor adapted to generate a propellant force for rotational blades, a pitch varying motor adapted to generate a rotational motion for changing pitch angles of the rotational blades, a rotation-linear motion converting unit adapted to convert the rotational motion generated by the pitch varying motor into a linear motion, and a linear motion-rotation converting unit adapted to convert the linear motions converted by the rotation-linear motion converting unit into rotational motions. At least a part of the linear motion-rotation converting unit is located within the propellant-force generating motor.

7 Claims, 24 Drawing Sheets

(56) References Cited

FOREIGN PATENT DOCUMENTS

| JP | 2011-521833 A | 7/2011 | |
|---|---|---|---|
| JP | 2013-230076 A | 11/2013 | |
| WO | WO-0015949 A1 * | 3/2000 | ............. B64C 11/44 |
| WO | 2009-144477 A3 | 3/2010 | |

* cited by examiner

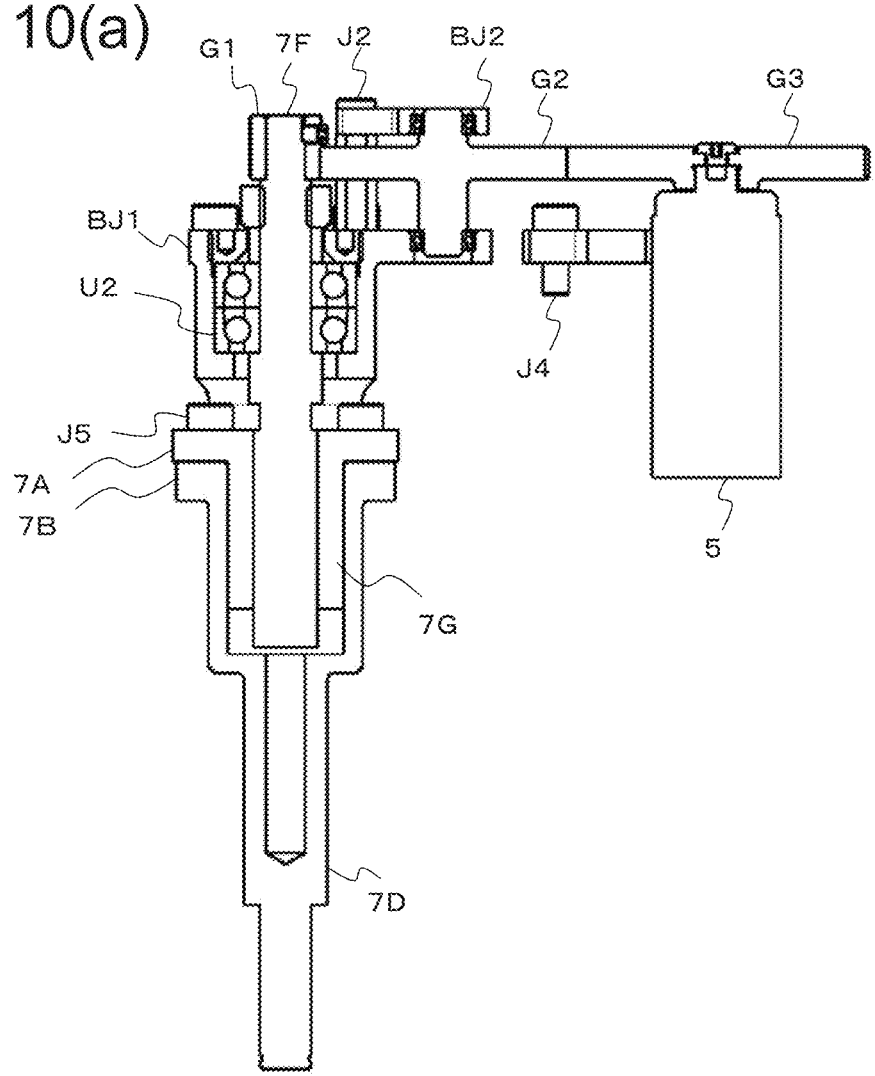

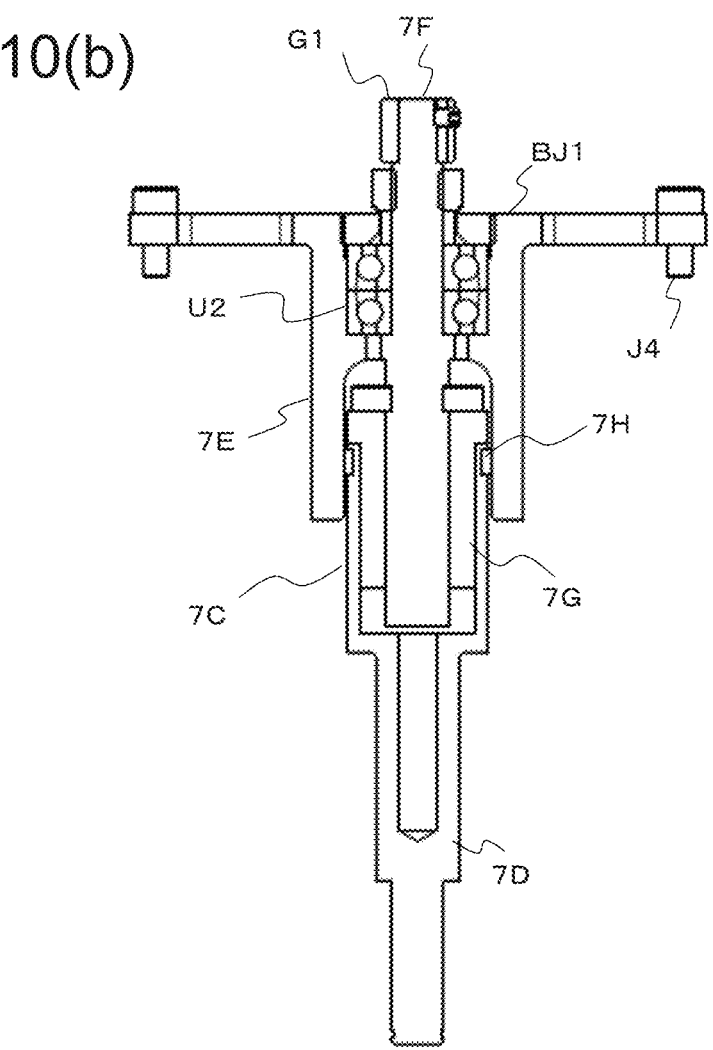

Fig. 20
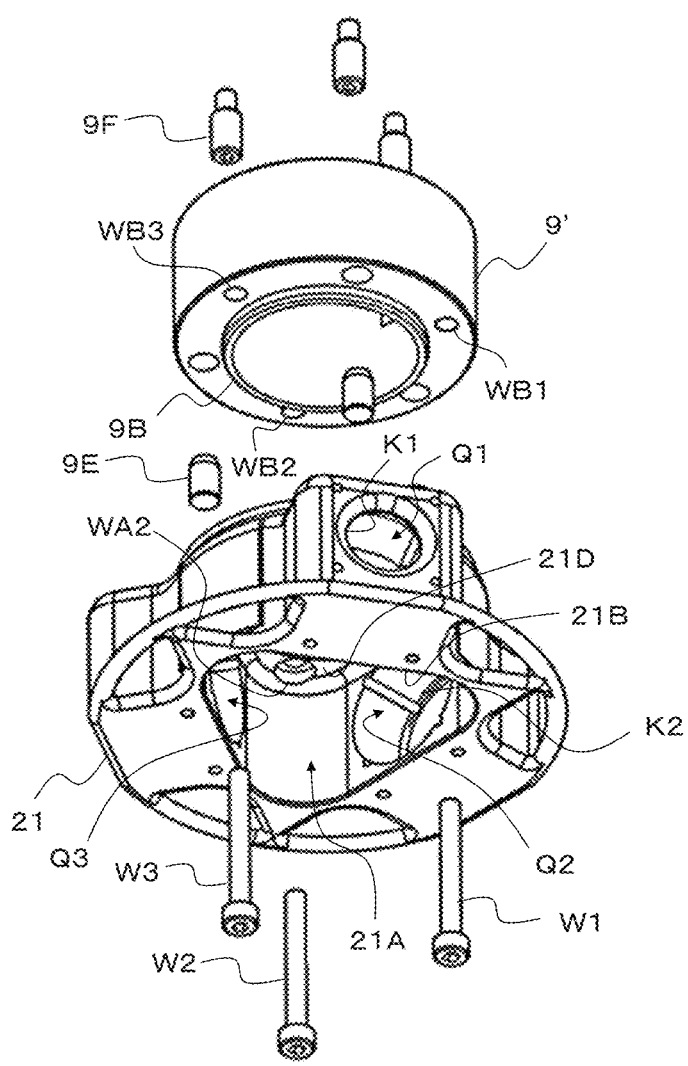
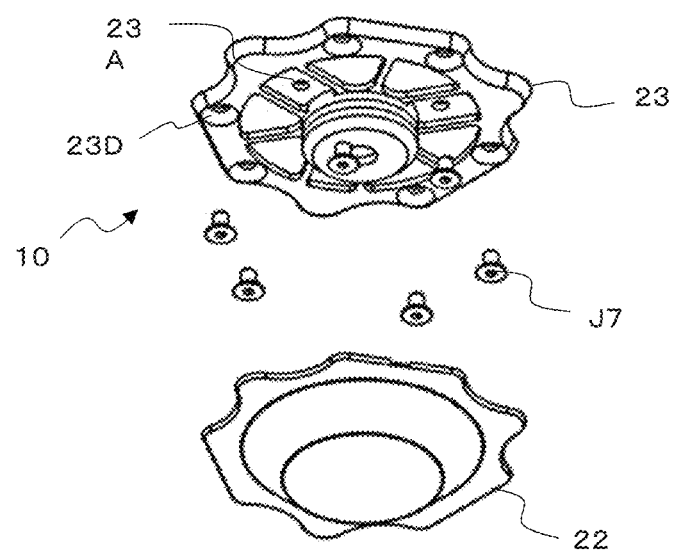

PROPELLANT FORCE GENERATOR

CROSS REFERENCE TO RELATED APPLICATIONS

This application is a U.S. National Phase Application under 35 U.S.C. 371 of International Application No. PCT/JP2021/010917, filed on Mar. 17, 2021, which claims priority to Japanese Patent Application No. 2021-043982, filed on Mar. 17, 2021 and Japanese Patent Application No. 2020-047046, filed on Mar. 17, 2020. The entire disclosures of the above applications are expressly incorporated by reference herein.

BACKGROUND

Technical Field

The present invention relates to propellant force generators.

Related Art

A technology for electrically adjusting the pitch angle of a propeller (rotor blade), which is the mounting angle to the rotational axis, without using hydraulic pressure is disclosed, for example, in JP-A-5-87037. In this technology, an operating rod is concentrically arranged in a hollow rotational shaft so that it can move only in the axial direction, and the arms fixed to the lower ends of the operating rod are connected to supporting shafts of the blades via links and lever mechanisms. By reciprocating the operating rod in the axial direction, the mounting angle of each blade is changed through the link and lever mechanism.

However, in the technology disclosed in JP-A-5-87037, a threaded portion screwed into the top of the operating rod is aligned linearly with an electric motor to which an input shaft for an actuation mechanism is connected, and the size of the overall device in the axial direction is large.

Accordingly, it is an object of the present invention to provide a propellant force generator capable of varying the pitch angle of rotational blades driven by a motor while reducing the size of the propellant force generator in the axial direction of the rotational shaft of a motor.

SUMMARY

In order to solve the above problem, according to an aspect of the present invention, there is provided a propellant force generator including a first motor adapted to generate a propellant force for rotational blades; a second motor adapted to generate a rotational motion for changing pitch angles of the rotational blades; a first converting unit adapted to convert the rotational motion generated by the second motor into a linear motion; and a second converting unit adapted to convert the linear motion converted by the first converting unit into rotational motions, at least a part of the first converting unit being located within the first motor.

This reduces the amount of protrusion of the first converting unit from the first motor in the axial direction of the rotational shaft of the first motor. Accordingly, the propellant force generator can be made smaller in the axial direction of the rotational shaft of the first motor while the first motor generates the propellant force for the rotational blades and the second motor varies the pitch angle of the rotational blades.

In a propellant force generator according to one aspect of the present invention, the first motor includes a rotational shaft having a hollow section extending along an axial direction of the rotational shaft, and at least a part of the first converting unit is located within the hollow section.

This allows at least a part of the first converting unit to be located within the first motor without enlarging the first motor in the axial direction of the rotational shaft, thereby reducing the size of the propellant force generator in the axial direction of the rotational shaft.

A propellant force generator according to one aspect of the present invention further includes a rotation transmission unit adapted to transmit the rotational motion generated by the second motor toward a direction perpendicular to a direction of a rotational axis of the second motor.

This makes it possible to arrange the rotational axes of the first motor and the second motor in parallel, and to locate at least a part of the second motor within the first motor.

A propellant force generator according to one aspect of the present invention further includes the second converting unit adapted to convert the linear motion converted by the first converting unit into rotational motions, in which the second converting unit includes a hub adapted to support the rotational blades, and at least a part of the second converting unit is located within the hub.

In this case, the space needed for locating the second converting unit can be reduced, and the propellant force generator can be made smaller.

In a propellant force generator according to one aspect of the present invention, the second converting unit includes a linear mover including N surfaces corresponding to N rotational blades, N being a positive integer, the linear mover moving linearly in accordance with the linear motion converted by the first converting unit; and N racks and N pinions corresponding to the N rotational blades, the N racks of the N racks and N pinions being supported by the N surfaces, respectively, the N pinions of the N racks and N pinions being supported on sides of support shafts for the N rotational blades, respectively.

In this case, a linear motion of the single linear mover can generate N rotational motions about the support shafts for the N rotational blades. Therefore, the pitch angles of the N rotational blades can be made variable while the second converting unit can be located within the hub.

In a propellant force generator according to one aspect of the present invention, the first converting unit includes a ball screw.

This enables the drive torque to be reduced compared to a case in which a leadscrew is used, and the power consumption of the second motor can be reduced.

In a propellant force generator according to one aspect of the present invention, the first motor includes a stator and a rotor, and the ball screw includes a ball screw shaft and a ball screw nut, in which the ball screw shaft is rotatably supported by a stationary member of the first motor, and the ball screw nut is screwed to the ball screw shaft via balls and is guided to move linearly along the rotational axis.

In this way, the rotational motion of the ball screw shaft can be converted into the linear motion of the ball screw nut.

A propellant force generator according to one aspect of the present invention further includes a linear motion transmission shaft adapted to transmit the linear motion converted by the first converting unit to the second converting unit, and the linear motion transmission shaft is fixed to a ball screw nut of the ball screw, the linear motion transmission shaft including a surface adapted to restrict motion of the linear motion transmission shaft to a linear motion along a direction of the linear motion.

In this case, it is possible to prevent the ball screw nut from rotating when the ball screw rotates, and to convert the rotational motion of the ball screw shaft into the linear motion of the ball screw nut and the linear motion transmission shaft. In addition, by providing the linear motion transmission shaft with a surface adapted to restrict motion of the linear motion transmission shaft to a linear motion along a direction of the linear motion, parts such as linear guides adapted to restrict motion of the linear motion transmission shaft to a linear motion along a direction of the linear motion are unnecessary, and the first converting unit can be located within a hollow section within the rotating shaft of the first motor.

Effect of the Invention

According to one aspect of the present invention, it is possible to reduce the size of the propellant force generator in the axial direction of the rotational shaft of a motor while making the pitch angles of the rotational blades driven by the motor variable.

BRIEF DESCRIPTION OF THE DRAWINGS

FIG. 10(a) is a cross-sectional view taken along line D-D in FIG. 9.

FIG. 10(b) is a cross-sectional view taken along line E-E in FIG. 9.

FIG. 20 is an exploded perspective view of a hub and an extension in FIG. 14(b).

DETAILED DESCRIPTION

Hereinafter, with reference to the accompanying drawings, embodiments according to the present invention will be described in detail. The following embodiment does not limit the present invention, and not all of the combinations of features in the embodiments may be essential to the present invention. Structures of the embodiments may be modified or changed as appropriate depending on specifications and various conditions (usage conditions, usage environment, etc.) of an apparatus to which the present invention is applied. The technical scope of the present invention is determined by the claims and is not limited by the following individual embodiments. It is of note that the drawings used in the following description may differ in scale and shape from the actual structure for the purpose of clarity.

In the following, an embodiment in which three rotational blades driven by a propellant force generator will be described as an example, but the number of rotational blades driven by the propellant force generator is not necessarily limited to three, and can be N (where N is a positive integer).

Figure 1A:
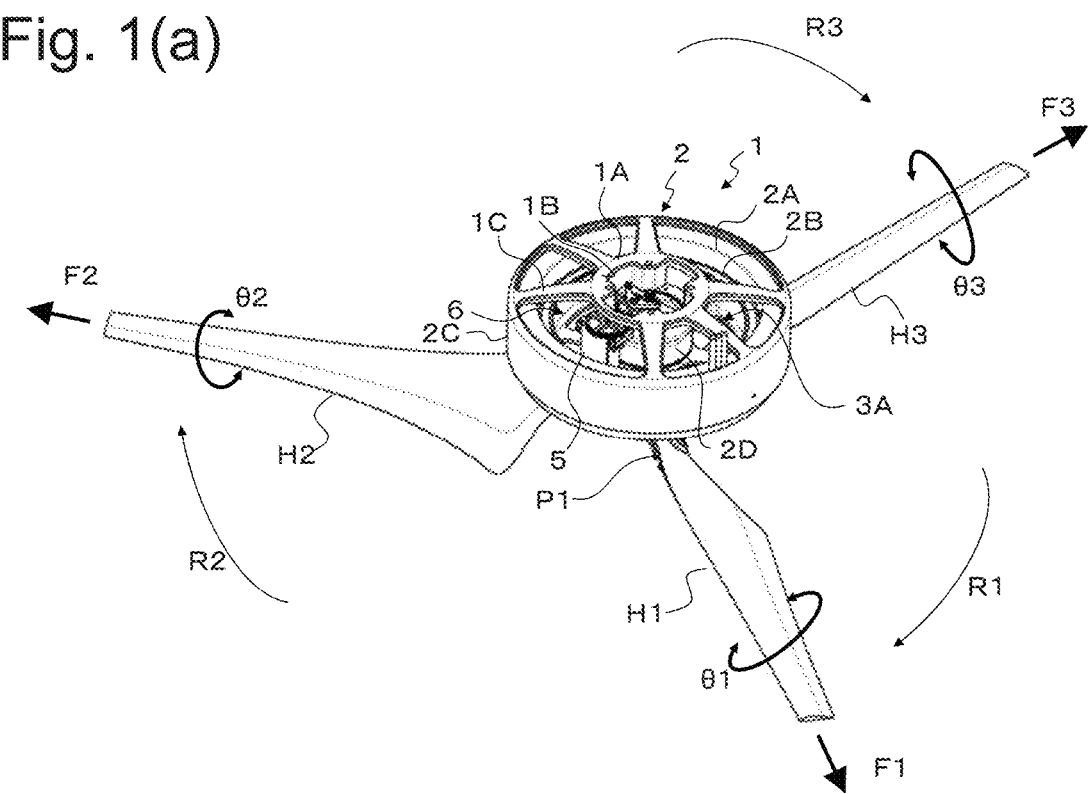
FIG. 1(a) is a perspective view of a propellant force generator according to a first embodiment to which rotational blades are attached.
Figure 1B:
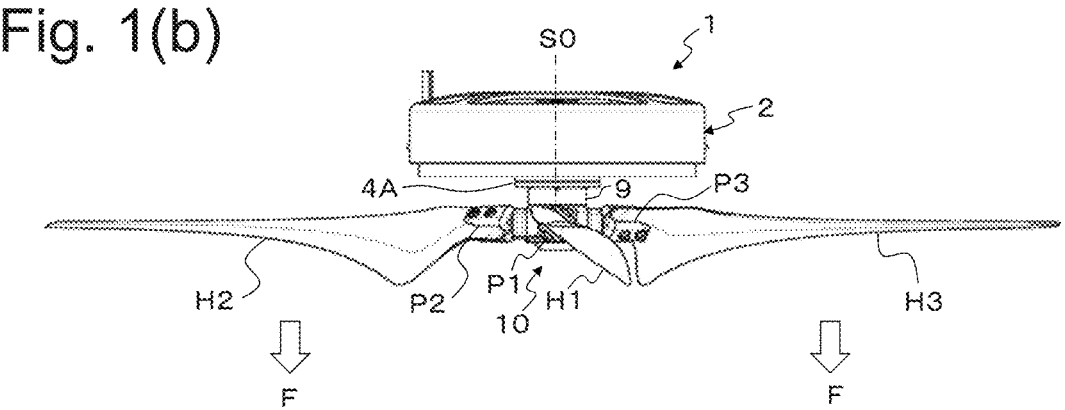
FIG. 1(b) and FIG. 1(c) are side views of the rotational blades attached to the propellant force generator according to the first embodiment in which the pitch angles of the rotational blades are varied.
Figure 1C:
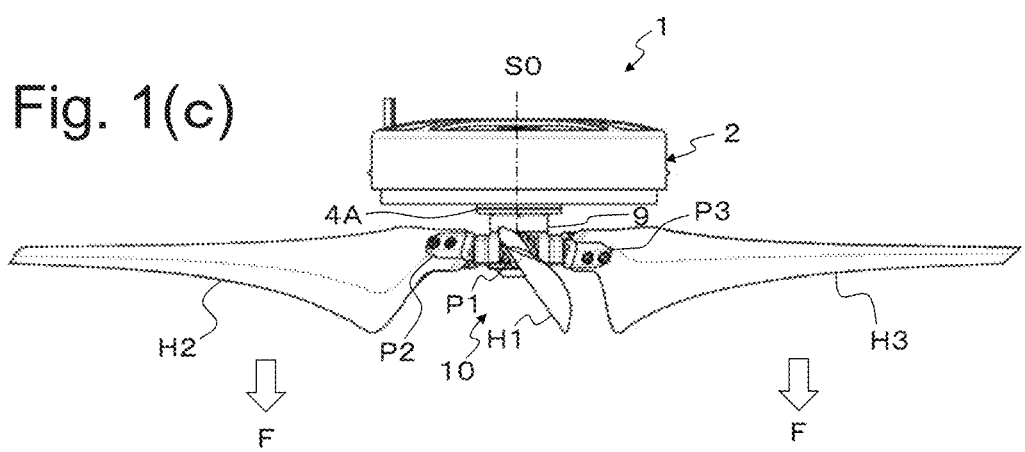
Figure 2:
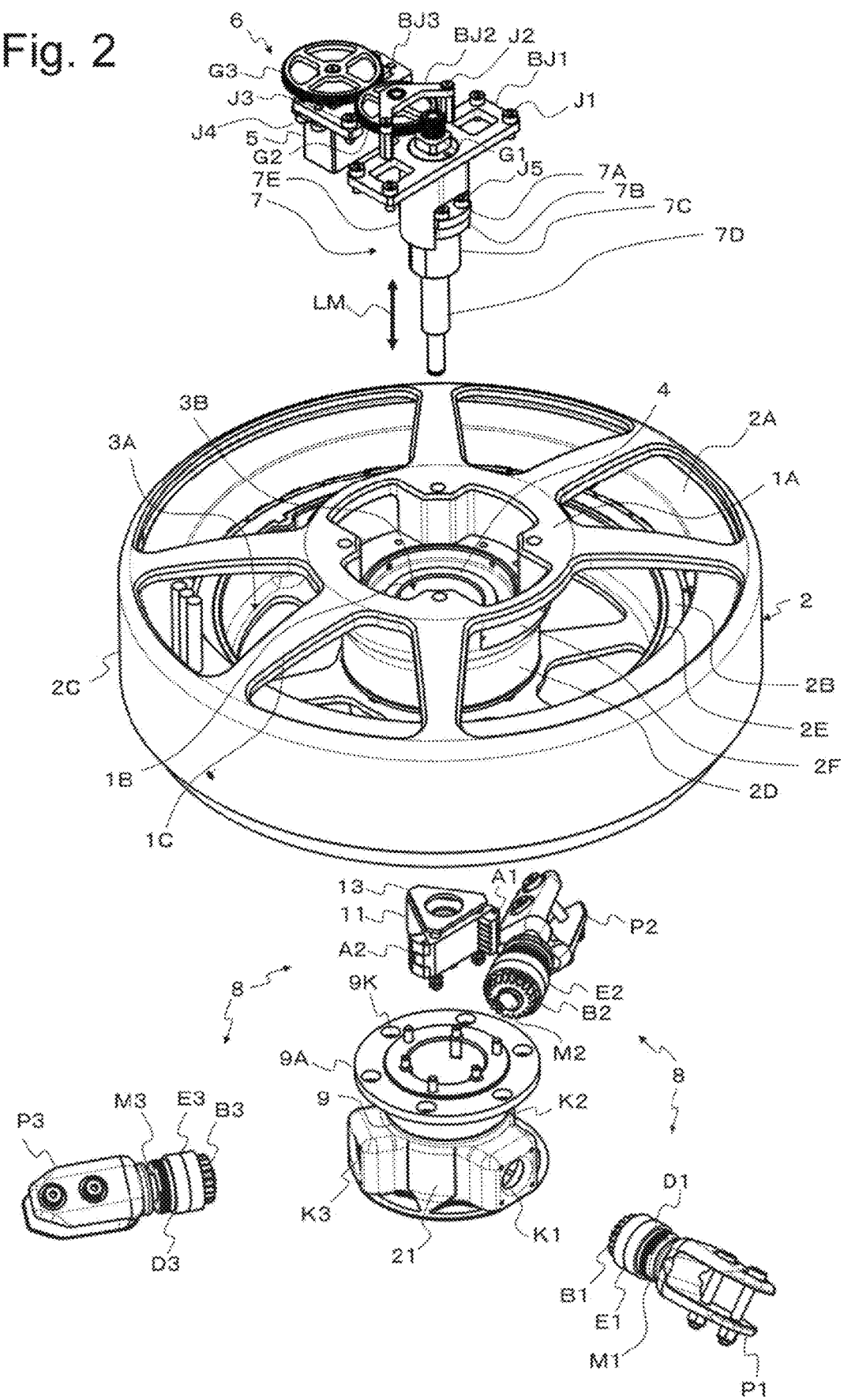
FIG. 2 is an exploded perspective view of the propellant force generator in FIG. 1(a) viewed from one side for the rotational shaft.
Figure 3:
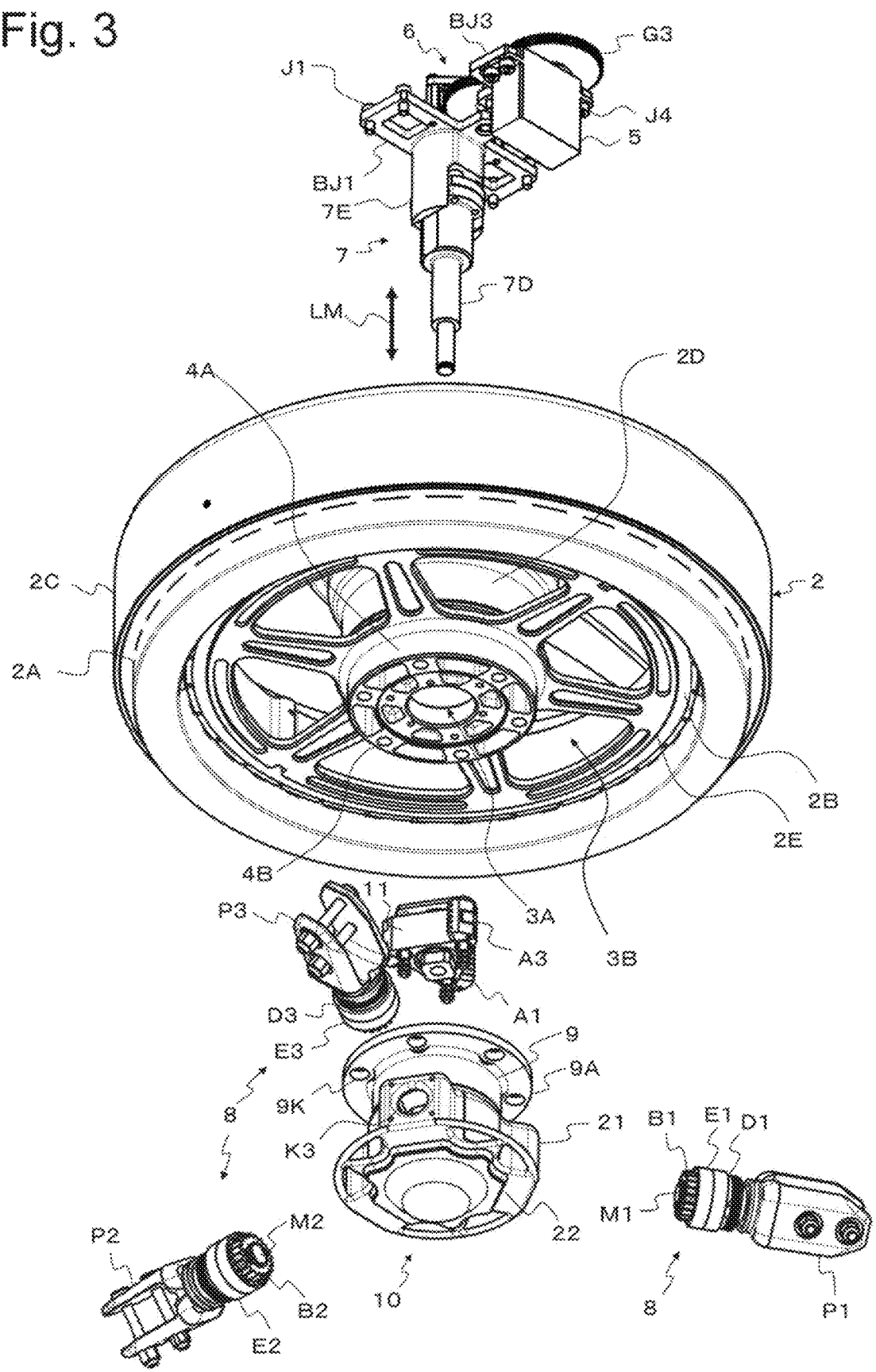
FIG. 3 is an exploded perspective view of the propellant force generator in FIG. 1(a) viewed from another side for the rotational shaft.
Figure 4A:
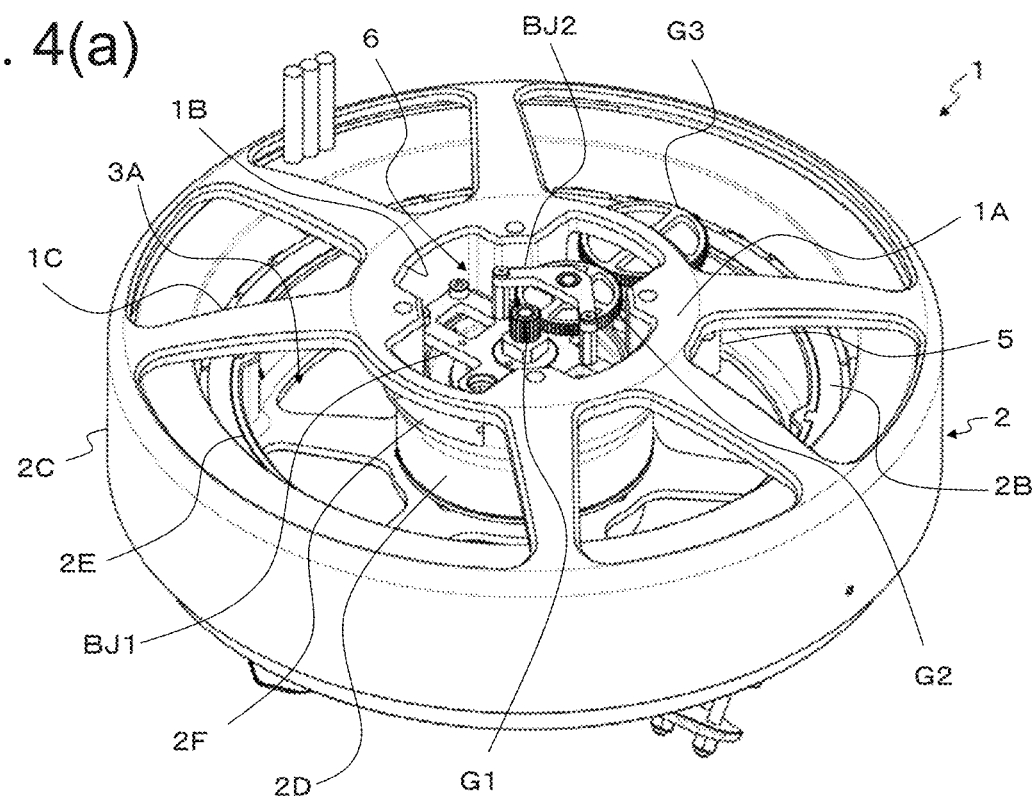
FIG. 4(a) is a perspective view showing the configuration of the propellant force generator corresponding to FIG. 2 after assembly.
Figure 4B:
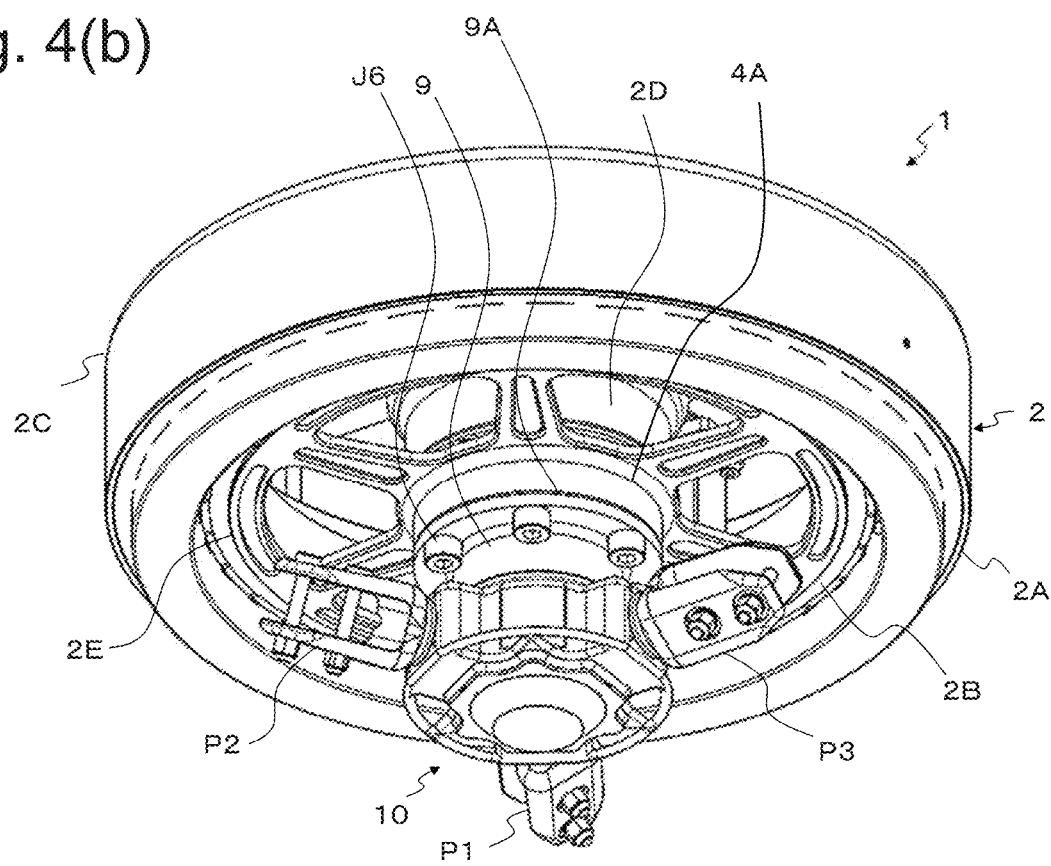
FIG. 4(b) is a perspective view showing the configuration of the propellant force generator corresponding to FIG. 3 after assembly.

FIG. 1(a) is a perspective view of a propellant force generator according to a first embodiment to which rotational blades are attached. FIG. 1(b) and FIG. 1(c) are side views of the rotational blades attached to the propellant force generator according to the first embodiment in which the pitch angles of the rotational blades are varied. FIGS. 2 and 3 are exploded perspective views of the propellant force generator in FIG. 1(a). FIGS. 4(a) and 4(B) are perspective views showing the configuration of the propellant force generator after assembly.

As shown in FIG. 1(a), FIG. 1(b) and FIG. 1(c), a propellant force generator 1 electrically drives the rotational blades H1 to H3. The rotational blades H1 to H3 are mounted to the propellant force generator 1 via grips P1 to P3, respectively. The grips P1 to P3 support the rotational blades H1 to H3 so that they extend radially in horizontal directions from the propellant force generator 1. The propellant force generator 1 is attached to a flying object via a mounting surface 1A. The flying object, to which the propellant force generator 1 is attached is, for example, a flight-capable fuselage or body such as a motor-driven multicopter, an airplane, a rotorcraft, or an automobile having a flight function.

As shown in FIG. 1(a), FIG. 1(b), FIG. 1(c), FIG. 2, FIG. 3, FIG. 4(a), and FIG. 4(b), the propellant force generator 1 includes a propellant-force generating motor (first motor) 2, a pitch varying motor (second motor) 5, a rotation transmission unit 6, a rotation-linear motion converting unit (first converting unit) 7, a linear motion-rotation converting unit (second converting unit) 8, an extension 9, and a hub 10. The propellant-force generating motor 2 includes a stator 2A, a rotor 2B, an outer frame 2C, an inner tube 2D, and an inner frame 2E. The rotor 2B includes a rotor shaft 4 and hollow sections 3A and 3B on the radial inside thereof. At the axial end of the rotor shaft 4, a mounting part 4A is provided for mounting the hub 10 via the extension 9.

The inner frame 2E is located radial outside the inner tube 2D, whereas the outer frame 2C is located radial outside the inner frame 2E. The inner tube 2D is fixed to the outer frame 2C. The inner frame 2E is fixed to the rotor shaft 4 and rotates together with the rotor shaft 4. The rotor shaft 4 is located within the inner tube 2D. The mounting part 4A is located radial outside the inner tube 2D. The rotor 2B is located outside the outer peripheral surface of the inner frame 2E. The stator 2A is located inside the inner peripheral surface of the outer frame 2C. The rotor shaft 4, the inner tube 2D, the inner frame 2E, the rotor 2B, the stator 2A, and the outer frame 2C are arranged concentrically with the rotational axis S0, and are arranged in this order from the radial inside to the radial outside.

The propellant-force generating motor 2 generates a propellant force F for the rotational blades H1 to H3. The stator 2A is composed of an electromagnetic steel plate and coils, and is located outside the rotor 2B. The stator 2A, the inner tube 2D, and the mounting surface 1A are fixed to the outer frame 2C. The mounting surface 1A can be fixed to the outer frame 2C via supporting portions 1C. The inner tube 2D can be fixed to the back side of the mounting surface 1A via a spacer 2F. The spacer 2F can secure a space for accommodating the rotation transmission unit 6 within the propellant-force generating motor 2.

The mounting surface 1A includes an opening 1B through which the rotation transmission unit 6 can be inserted into the outer frame 2C. The support portions 1C extend radially inward from the outer frame 2C. The inner tube 2D is cylindrical in shape and rotatably supports the rotor shaft 4 by a bearing U1 therein. The inner frame 2E is circular and annular in shape and supports the rotor 2B. The outer frame 2C is circular and annular in shape and supports the stator 2A.

The mounting surface 1A, the outer frame 2C, the inner tube 2D, the inner frame 2E and the spacer 2F can be made of an alloy such as duralumin. The mounting surface 1A, the outer frame 2C, the inner tube 2D, the inner frame 2E, and the spacer 2F can be integrally formed, for example, by casting, forging, or cutting.

The rotor 2B includes magnets and other elements and is located outside the rotor shaft 4. The rotor 2B and the rotor shaft 4 are fixed to the inner frame 2E. The rotor shaft 4 rotates around the rotational axis S0 via the bearing U1. As the rotor shaft 4 rotates, the rotor 2B and the inner frame 2E also rotate around the rotational axis S0. The rotor shaft 4, the mounting part 4A, and the inner frame 2E can be made of an alloy such as duralumin. The rotor shaft 4, the mounting part 4A, and the inner frame 2E can be integrally formed, for example, by casting, forging, or cutting.

The hollow sections 3A and 3B are located inside the propellant-force generating motor 2. The hollow sections 3A are located between the rotor 2B and the rotor shaft 4 along a circumferential direction of the rotor 2B. The hollow section 3B is located radial inside the rotor shaft 4 and extends along the axial direction of the rotor shaft 4.

The pitch varying motor 5 generates a rotational motion for changing the pitch angles θ1 to θ3 of the rotational blades H1 to H3. The pitch varying motor 5 is fixed to the inner tube 2D. At least a part of the pitch varying motor 5 is located within the propellant-force generating motor 2. The pitch varying motor 5 can be located within the hollow section 3A. The rotational axis of the pitch varying motor 5 can be aligned in parallel with the rotational axis S0 of the propellant-force generating motor 2.

The rotation transmission unit 6 transmits the rotational motion generated by the pitch varying motor 5 toward a direction perpendicular to the direction of the rotational axis S0 of the propellant-force generating motor 2. In other words, the rotational axis of the pitch varying motor 5 and the rotational axis S0 of the propellant-force generating motor 2 are parallel to each other, and the rotation transmission unit 6 transmits the rotational motion generated by the pitch varying motor 5 to a shaft disposed along the rotational axis S0 of the propellant-force generating motor 2. The rotation transmission unit 6 is fixed to the inner tube 2D. At least a part of the rotation transmission unit 6 is located within the propellant-force generating motor 2.

The rotation-linear motion converting unit 7 converts the rotational motion generated by the pitch varying motor 5 and transmitted through the rotation transmission unit 6 into a linear motion LM in the axial direction of the rotational axis S0. At least a part of the rotation-linear motion converting unit 7 is located within the propellant-force generating motor 2. At least a part of the rotation-linear motion converting unit 7 can protrude from the hollow section 3B along the axial direction of the rotational axis S0 toward the side of the rotational blades H1 to H3. The rotation-linear motion converting unit 7 is fixed to the inner tube 2D.

The linear motion-rotation converting unit 8 converts the linear motion LM converted by the rotation-linear motion converting unit 7 into rotational motions around the axes of support shafts M1 to M3. The linear motion-rotation converting unit 8 is located outside the propellant-force generating motor 2.

The extension 9 is a spacer that maintains the distance between the propellant-force generating motor 2 and the rotational blades H1 to H3 in the axial direction of the rotational axis S0. The extension 9 prevents the rotational blades H1 to H3 from colliding with the propellant-force generating motor 2. The extension 9 is fixed to the rotor shaft 4 via the mounting part 4A, and rotates together with the rotor shaft 4. The extension 9 can be a cylindrical pipe through which a linear motion transmission shaft 7D passes in the axial direction of the rotor shaft 4.

The hub 10 contains the linear motion-rotation converting unit 8 and supports the grips P1-P3 in such a manner that the grips P1-P3 protrudes from the hub 10. The hub 10 is fixed to the rotor shaft 4 via the extension 9. In other words, the hub 10 is supported by the outer frame 2C via the rotor shaft 4 in such a manner that it can rotate about the rotational axis S0. The hub 10 supports the rotational blades H1 to H3 via the grips P1 to P3 in directions perpendicular to the axial direction of the rotational axis S0.

When the propellant-force generating motor 2 operates, the rotor 2B rotates around the rotational axis S0, so that the rotational blades H1 to H3 rotate. The rotations R1 to R3 of the rotational blades H1 to H3 generate the propellant force F of the rotational blades H1 to H3.

In this embodiment, the pitch varying motor 5, the rotation transmission unit 6, and the rotation-linear motion converting unit 7 are fixed to the outer frame 2C. Therefore, although the rotor 2B rotates, the pitch varying motor 5, the rotation transmission unit 6, and the rotation-linear motion converting unit 7 do not rotate about the rotational axis S0.

When the pitch varying motor 5 operates, the rotational blades H1 to H3 rotate about the axes of the support shafts M1 to M3, and the pitch angles θ1 to θ3 of the rotational blades H1 to H3 change. The rotational motion of the pitch varying motor 5 is transmitted to the rotation-linear motion converting unit 7 through the rotation transmission unit 6. Then, the rotational motion of the pitch varying motor 5 is converted into a linear motion LM in the axial direction of the rotational axis S0 by the rotation-linear motion converting unit 7. The linear motion LM converted by the rotation-linear motion converting unit 7 is then converted into three rotational motions about the axes of the support shafts M1 to M3 by the linear motion-rotation converting unit 8. Then, the rotational motions of the support axes M1 to M3 are transmitted to the rotational blades H1 to H3 through the grips P1 to P3 respectively, and the pitch angles θ1 to θ3 of the rotational blades H1 to H3 are changed.

The propellant force generator 1 can vary the propellant force by changing the pitch angles θ1 to θ3 of the rotational blades H1 to H3. By varying the pitch angles θ1 to θ3, the propellant force generator 1 can improve the stability of the flying object by increasing the response speed of change in the propellant force, and can secure the necessary propellant force for the flying object without increasing the blade length (the length of the rotational blades H1 to H3), and thus reducing the size and weight of the propellant force generator 1. In addition, since the propellant force needed in various situations can be generated at a lower rotational speed of the propellant-force generating motor 2 in comparison with a propellant force generator of which the pitch angles are fixed, noise dependent on the rotational speed can be reduced.

In addition, the pitch angles θ1 to θ3 of the rotational blades H1 to H3 are electrically variable in the propellant force generator 1, thereby eliminating the need to use hydraulic pressure. This eliminates the need to provide a hydraulic control unit to control the supply and discharge of oil and complicated rotating seal mechanisms for oil sealing for rotational members, resulting in preventing the propellant force generator 1 from increasing in size and in improving the maintainability of the propellant force generator 1.

In addition, the linear motion-rotation converting unit 8 converts the single linear motion LM converted by the rotation-linear motion converting unit 7 into three rotational motions around the axes of the support axes M1 to M3. Accordingly, the pitch angles θ1 to θ3 of the three rotational blades H1 to H3 can be adjusted based on the single linear motion LM converted by the rotation-linear motion converting unit 7, resulting in preventing the propellant force generator 1 from increasing in size.

Furthermore, by containing at least a part of the pitch varying motor 5 in the propellant-force generating motor 2, the amount of protrusion of the pitch varying motor 5 from the propellant-force generating motor 2 in the axial direction of the rotational axis S0 can be reduced. Therefore, although the propellant-force generating motor 2 generates the propulsive force of the rotational blades H1 to H3 and the pitch angles θ1 to θ3 of the rotational blades H1 to H3 are varied by the pitch varying motor 5, the propellant force generator 1 can be made smaller in the axial direction of the rotational axis S0.

Furthermore, by locating at least a part of the pitch varying motor 5 within one of the hollow sections 3A, it is possible to locate at least a part of the pitch varying motor 5 within the propellant-force generating motor 2 without increasing the size of the propellant-force generating motor 2 in the axial direction of the rotational axis S0, and the propellant force generator 1 can be made smaller in the axial direction of the rotational axis S0.

Furthermore, by transmitting the rotational motion generated by the pitch varying motor 5 through the rotation transmission unit 6, it is possible to arrange the rotational axis S0 of the propellant-force generating motor 2 and the rotational axis of the pitch varying motor 5 in parallel, and to locate the pitch varying motor 5 within the propellant-force generating motor 2.

Furthermore, by locating the linear motion-rotation converting unit 8 within the hub 10, it is possible to reduce the size of the propellant force generator 1 in the axial direction of the rotational axis S0 and to prevent the linear motion-rotation converting unit 8 from being exposed to the outside.

Furthermore, since the rotor shaft 4, the inner tube 2D, the inner frame 2E, the rotor 2B, the stator 2A, and the outer frame 2C are arranged concentrically with the rotational axis S0, and are arranged in this order from the radial inside to the radial outside, it is possible to prevent the size of the propellant-force generating motor 2 from being increased in the axial direction of the rotational axis S0 and to provide the hollow sections 3A, one of which can contain the pitch varying motor 5. At the same time, the stator 2A can be arranged around the rotor 2B while the rotor 2B is rotatably supported, and the propellant force generator 1 can be made smaller in the axial direction of the rotational axis S0.

When the rotational blades H1 to H3 rotate about the axis of the rotational shaft 4, centrifugal forces F1 to F3 are exerted on each of the rotational blades H1 to H3. The centrifugal forces F1 to F3 exerted on the rotational blades H1 to H3 are transmitted to the support shafts M1 to M3 through the grips P1 to P3, respectively. Based on the centrifugal forces F1 to F3 transmitted to the support shafts M1 to M3, the rotational axes of the support shafts M1 to M3 are automatically adjusted to improve the rotational accuracy of the support shafts M1 to M3 around their axes.

In the following, the configuration and operation of the rotation transmission unit 6, the rotation-linear motion converting unit 7, and the linear motion-rotation converting unit 8 will be described in more detail.

Figure 5A:
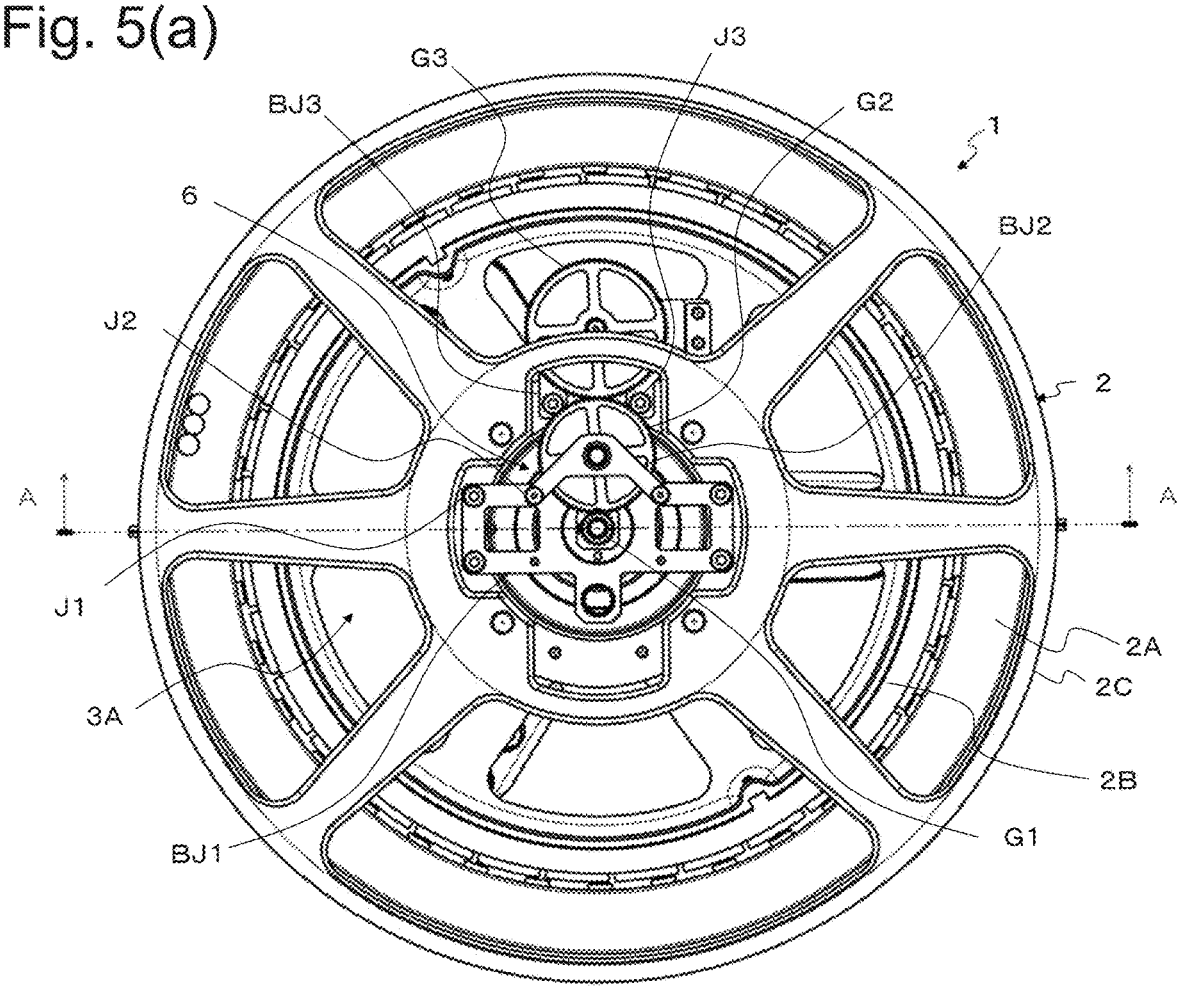
FIG. 5(a) is a plan view of the configuration of the first embodiment.
Figure 5B:
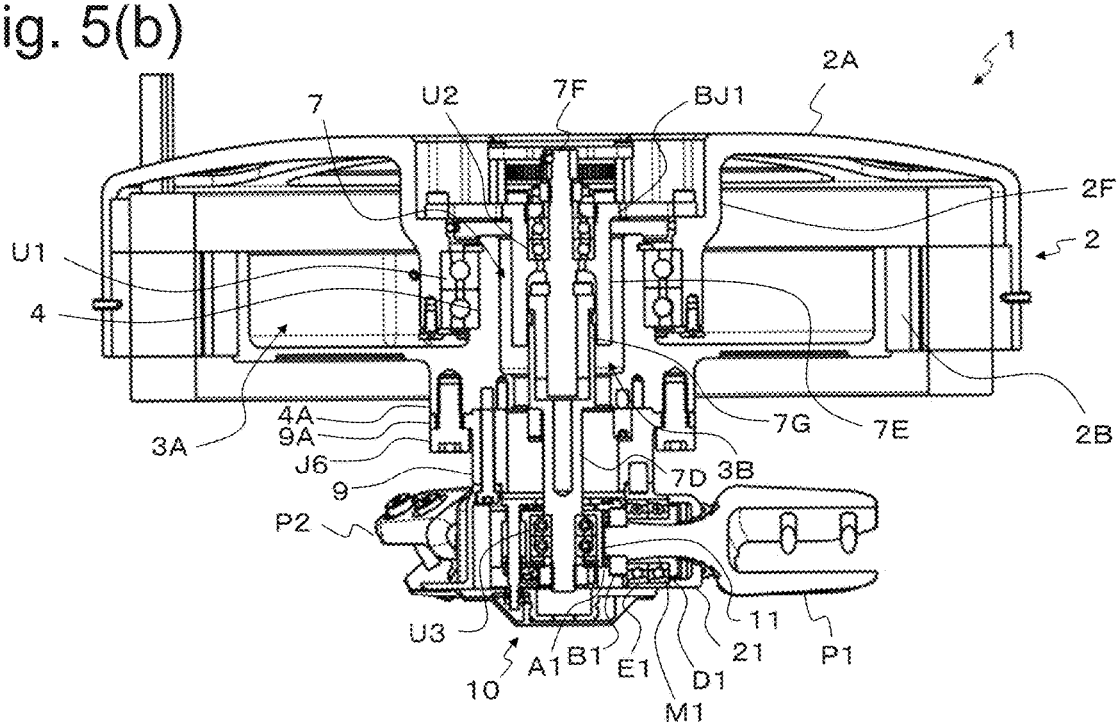
FIG. 5(b) is a cross-sectional view taken along line A-A in FIG. 5(a).
Figure 6A:
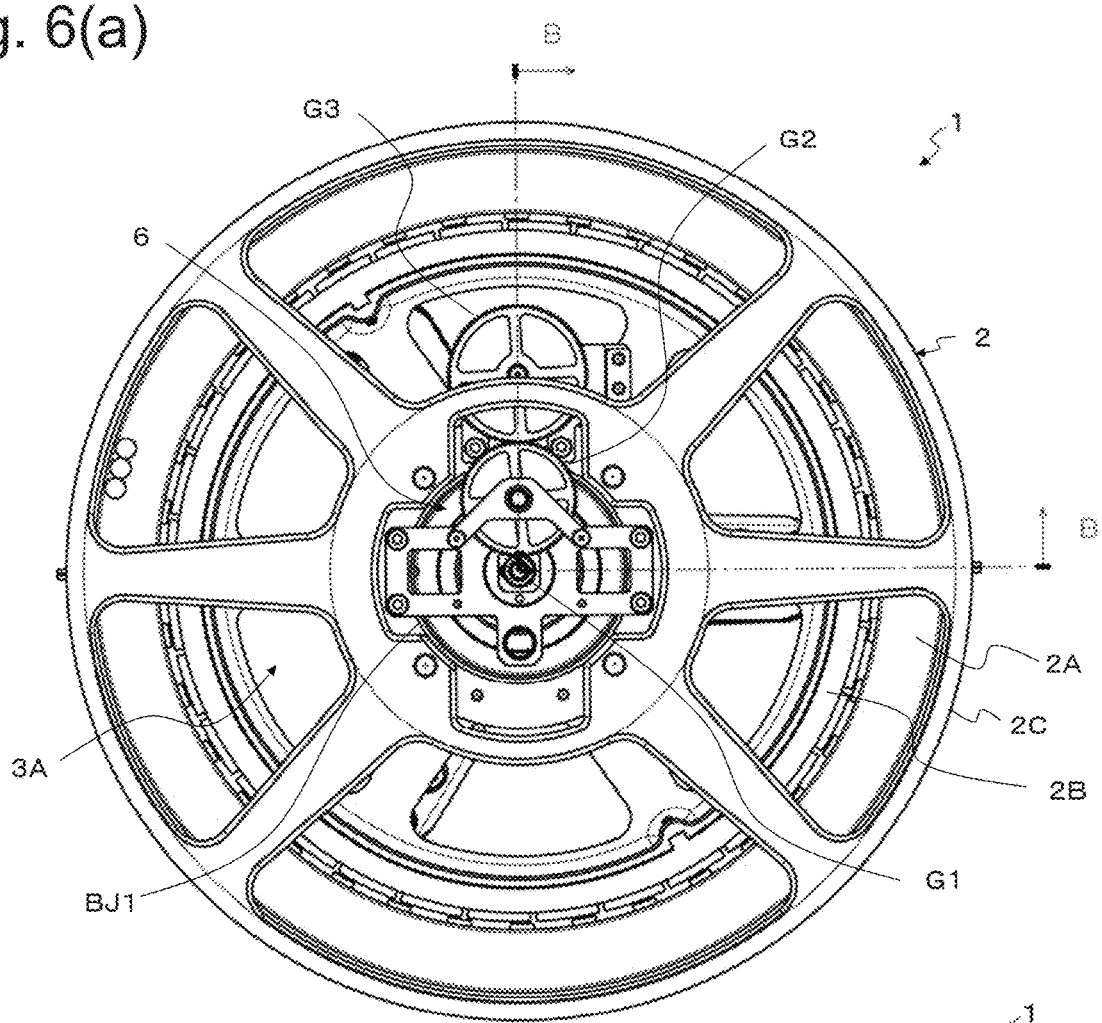
FIG. 6(a) is a plan view of the configuration of the first embodiment.
Figure 6B:
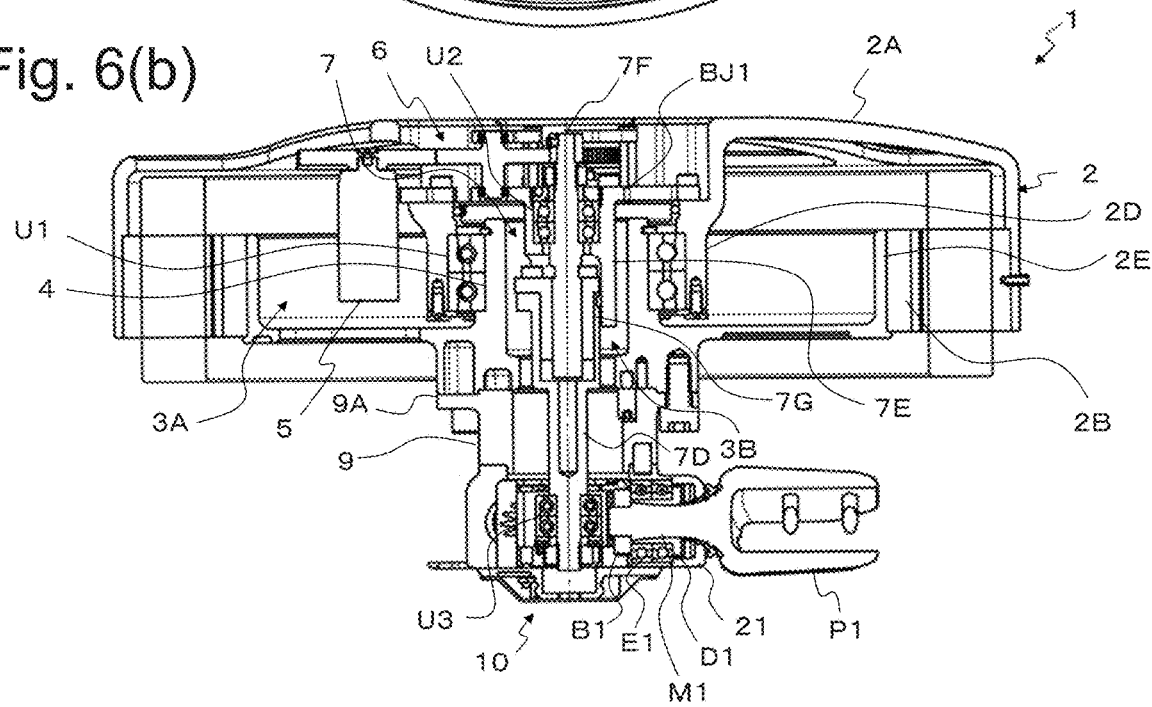
FIG. 6(b) is a cross-sectional view taken along line B-B in FIG. 6(a).
Figure 7A:
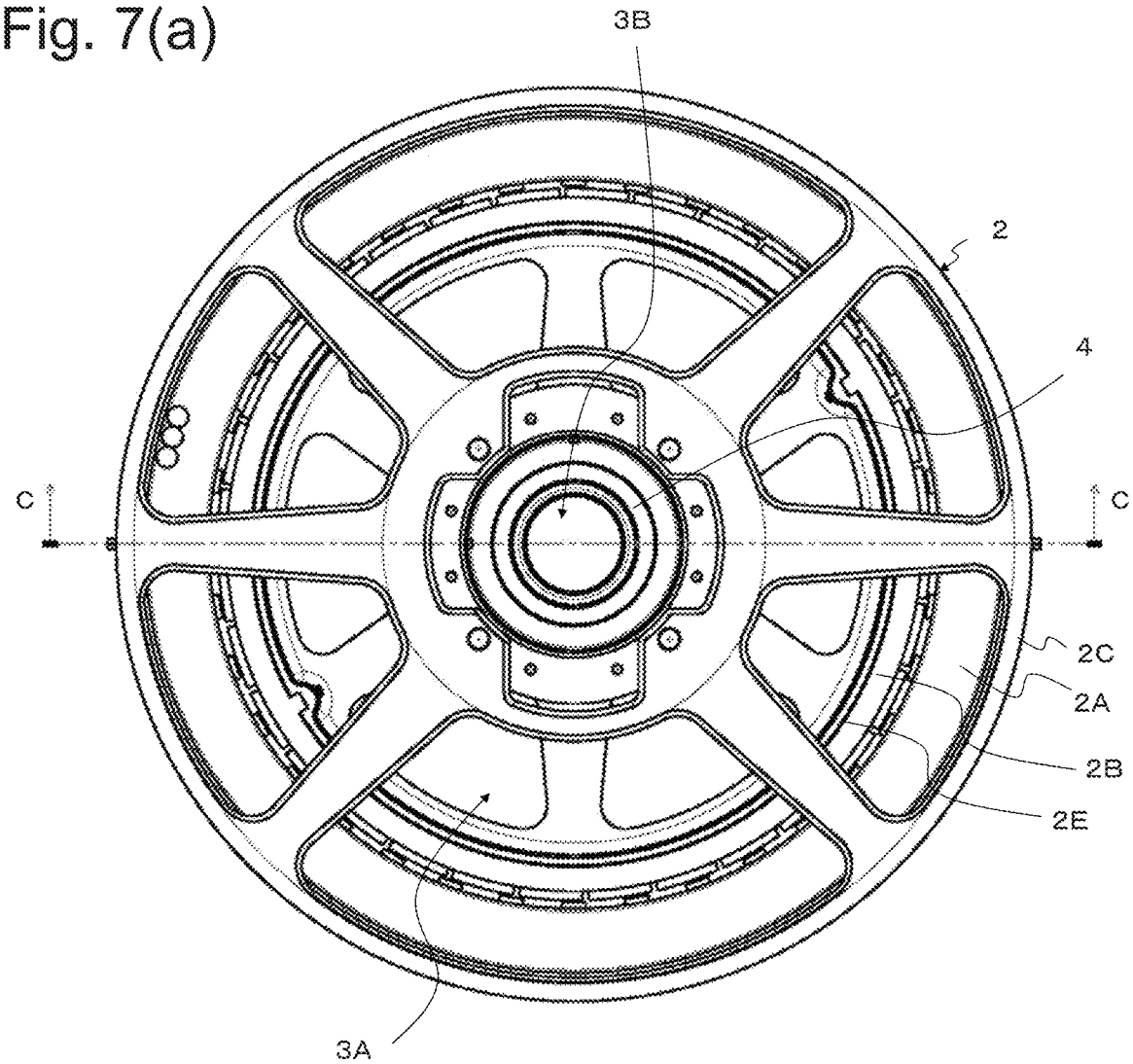
FIG. 7(a) is a plan view of the configuration of the propellant-force generating motor of the propellant force generator according to the first embodiment.

FIG. 5(a) and FIG. 6(a) are plan views of the configuration of the propellant force generator according to the first embodiment. FIG. 5(b) is a cross-sectional view taken along line A-A in FIG. 5(a), and FIG. 6(b) is a cross-sectional view taken along line B-B in FIG. 6(a). FIG. 7(a) is a plan view showing the configuration of the propellant-force generating motor of the propellant force generator according to the first embodiment, and FIG. 7(b) is a cross-sectional view taken along line C-C in FIG. 7(a).

Figure 7B:
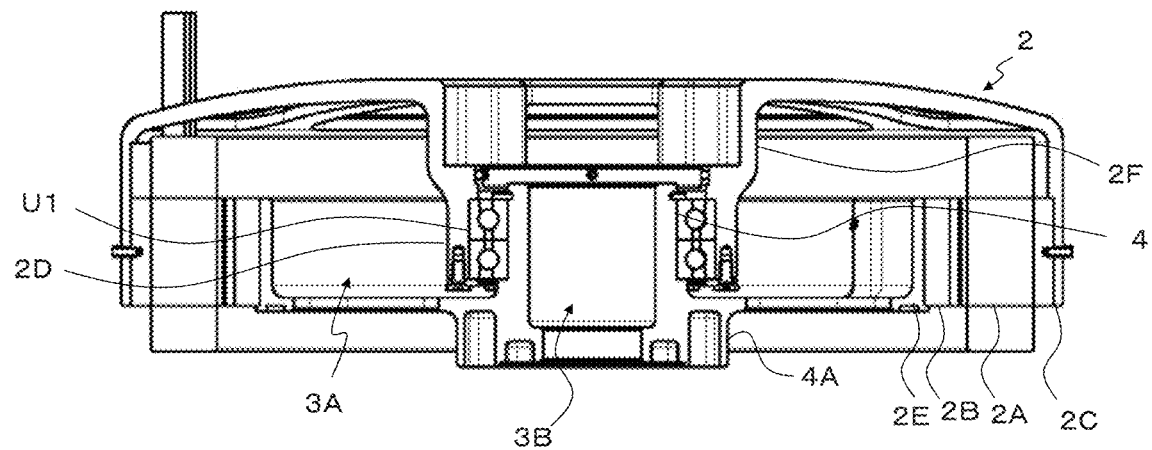
FIG. 7(b) is a cross-sectional view taken along line C-C in FIG. 7(a).

As shown in FIG. 7(a) and FIG. 7(b), the rotor 2B is supported by the outer frame 2C via the bearing U1 in such a manner that it can rotate around the rotational axis S0. In the propellant-force generating motor 2, the hollow sections 3A are provided between the rotor 2B and the rotor shaft 4, and the hollow section 3B is provided in the rotor shaft 4.

As shown in FIG. 2, FIG. 3, FIG. 5(a), FIG. 5(b), FIG. 6(a), and FIG. 6(b), the rotation transmission unit 6 includes gears G1 to G3 and support members BJ1 to BJ3. The gears G1 to G3 transmit the rotational motion of the pitch varying motor 5 to the rotation-linear motion converting unit 7. The gear G1 is mounted to one end of a ball screw shaft 7F. The gear G3 is mounted to the rotational shaft of the pitch varying motor 5. The gear G2 is positioned between the gears G1 and G3 so as to mesh with the gears G1 and G3.

The outer frame 2C supports the gear G1 and the rotation-linear motion converting unit 7 via the support member BJ1 in such a manner that the gear G1 and the ball screw shaft 7F can rotate. In addition, the outer frame 2C rotatably supports, via the support member BJ3, the gear G3 and the rotational shaft of the pitch varying motor 5. In addition, the outer frame 2C rotatably supports the gear G2 via the support members BJ1 and BJ2. The gear G2 is sandwiched between the support members BJ1 and BJ2 and is placed in a position at which it meshes with the gears G1 and G3. The material of the gears G1 to G3 is, for example, a carbon steel, and the material of the supporting members BJ1 to BJ3 is, for example, an aluminum alloy. As a mechanism of the rotation transmission unit, a belt may be used instead of gears.

A ball screw can be used for the rotation-linear motion converting mechanism of the rotation-linear motion converting unit 7. A leadscrew may also be used for the rotation-linear motion converting mechanism of the rotation-linear motion converting unit 7. The rotation-linear motion converting unit 7 includes a linear motion transmission shaft 7D, a linear motion guide 7E, a ball screw shaft 7F and a ball screw nut 7G.

The linear motion guide 7E guides the ball screw nut 7G and the linear motion transmission shaft 7D so that they linearly move along the rotational axis S0. The linear motion guide 7E restricts rotation of the ball screw nut 7G although the ball screw shaft 7F rotates. The linear motion guide 7E has a shape that protrudes from the support member BJ1. The linear motion guide part 7E can be formed integrally with the support member BJ1.

The ball screw shaft 7F is rotatably supported by the support member BJ1 via the bearing U2. The ball screw shaft 7F rotates together with the gear G1 in such a manner that it is engaged with the ball screw nut 7G via balls, and causes the ball screw nut 7G to move linearly.

The ball screw nut 7G moves linearly with the rotational motion of the ball screw shaft 7F, and transmits the linear motion LM to the linear motion transmission shaft 7D.

The linear motion transmission shaft 7D transmits the linear motion LM of the ball screw nut 7G to the linear motion-rotation converting unit 8. The linear motion transmission shaft 7D is fixed to the ball screw nut 7G, and an end of the linear motion transmission shaft 7D is inserted into the inner race of the bearing U3. The linear motion transmission shaft 7D has a shape that encloses a part of the ball screw nut 7G and a part of the ball screw shaft 7F.

A rack and pinion can be used for the linear motion-rotation converting mechanism of the linear motion-rotation converting unit 8. The linear motion-rotation converting unit 8 includes a linear mover 11, racks A1 to A3, a case 21, support shafts M1 to M3, bearings E1 to E3, adapters D1 to D3, and pinions B1 to B3.

The linear mover 11 is supported by the bearing U3 rotatably about the axis of the linear motion transmission shaft 7D. The linear mover 11 is linearly movable together with the linear motion transmission shaft 7D along the axial direction of the rotational axis S0.

The racks A1 to A3 are supported by the linear mover 11. The racks A1 to A3 move linearly with the linear mover 11, and mesh with the pinions B1 to B3, and rotates the pinions B1 to B3 respectively.

The support shafts M1 to M3 support the grips P1 to P3, respectively, so that they project radially in horizontal directions from the propellant force generator 1. The support shafts M1 to M3 are held by the case 21 via the bearings E1 to E3, respectively, in such a manner that the support shafts M1 to M3 can rotate around the axes thereof. The grip P1 and the support shaft M1 can be integrally formed, the grip P2 and the support shaft M2 can be integrally formed, and the grip P3 and the support shaft M3 can be integrally formed. The material of the grips P1 to P3 and the support shafts M1 to M3 is, for example, duralumin. In order to increase the durability of the grips P1-P3 and the support shafts M1-M3, for example, titanium may be used as the material of the grips P1-P3 and the support shafts M1-M3.

The pinions B1 to B3 are fixed to the support shafts M1 to M3, respectively. The pinions B1 to B3 rotate with the linear motion LM of the racks A1 to A3, and transmit the rotational motions thereof to the support shafts M1 to M3, respectively. The material of the pinions B1 to B3 and the racks A1 to A3 is, for example, chromium molybdenum steel.

The case 21 can be used as part of the hub 10. The case 21 is, for example, an indecomposable case without joint surfaces. Such an indecomposable case can be fabricated by machining from an ingot. Accordingly, the indecomposable case can be fabricated without joining pieces by adhesives or welding. The indecomposable case may be a seamless case without joints. The case 21 encloses the linear mover 11, the racks A1 to A3, the support shafts M1 to M3, the bearings E1 to E3, the adapters D1 to D3, and the pinions B1 to B3. The case 21 can support the support shafts M1 to M3 at angular intervals of 120 degrees in the circumferential direction of the rotor shaft 4. The case 21 is fixed to an end face of the rotor 2B via the extension 9. The case 21 can also support the support shafts M1 to M3 enduring the centrifugal force exerted on the rotational blades H1 to H3 during rotation around the rotational axis S0. The case 21 can be formed, for example, by cutting duralumin.

The adapters D1 to D3 are disposed between the support shafts M1 to M3 and the bearings E1 to E3, respectively, and are supported by the support shafts M1 to M3 respectively. The inner peripheral surfaces of the adapters D1 to D3 are formed so that they conform with the outer peripheral surfaces of the support shafts M1 to M3, respectively, whereas the outer peripheral surfaces of the adapters D1 to D3 are formed so that they conform with the inner peripheral surfaces of the bearings E1 to E3, respectively. This enables the adapters D1 to D3 to support the support shafts M1 to M3 having varying outer diameters in such a manner that the adapters D1 to D3 are stationary within the bearings E1 to E3. The material of the adapters D1 to D3 is, for example, duralumin.

Each of the bearings U3, E1 to E3 can be, for example, a double-row angular contact ball bearing. A double-row angular contact ball bearing may be made up of two single-row angular contact ball bearings with a back-to-back arrangement and with a common outer race, or two single-row angular contact ball bearings with a front-to-back arrangement and with a common inner race. Double-row angular contact ball bearings are capable of capable of withstanding a radial load and axial loads in both directions. The back-to-back arrangement type can withstand moment loads.

The extension 9 includes a flange 9A. The flange 9A can be formed integrally with the extension 9. The extension 9 can be attached to an end face of the rotor shaft 4 via the flange 9A. The material of the extension 9 and the flange 9A is, for example, duralumin.

The flange 9A has a through-hole 9K penetrating the flange 9A in the axial direction of the rotor shaft 4. A bolt J6 can be inserted into the through-hole 9K. The mounting part 4A has a female thread 4B into which the bolt J6 can be screwed. The female thread 4B is located on the mounting surface side of the flange 9A. The through-hole 9K and the female screw 4B can be arranged corresponding to the insertion position of the bolt J6. The bolt J6 is inserted into the through-hole 9K and screwed into the female thread 4B to fix the flange 9A to the mounting part 4A, so that the extension 9 can be fixed to the rotor shaft 4.

When the pitch varying motor 5 rotates, the gears G1 to G3 rotate. Then, the ball screw shaft 7F rotates together with the rotation of the gear G1, resulting in that the linear motion transmission shaft 7D moves linearly along with the ball screw nut 7G. The motion of the ball screw nut 7G and the linear motion transmission shaft 7D is guided by the linear motion guide 7E, and is restricted to a linear motion along the axial direction of the rotational axis S0 in the propellant force generator 1.

The linear motion LM of the linear motion transmission shaft 7D is transmitted to the linear mover 11, resulting in linear motion of the racks A1 to A3 together with the linear mover 11. The racks A1 to A3 move linearly, causing rotations of the pinions B1 to B3 engaged with the racks A1 to A3. As the pinions B1 to B3 rotate, the support shafts M1 to M3 rotate about their respective axes. The rotations of the support shafts M1 to M3 are transmitted to the rotational blades H1 to H3 through the grips P1 to P3, respectively, and the pitch angles θ1 to θ3 of the rotational blades H1 to H3 are changed.

By using the ball screw as the rotation-linear motion converting mechanism of the rotation-linear motion converting unit 7, the drive torque needed for pitch variation can be reduced compared to a case in which a leadscrew is used, and the power consumption of the pitch variation motor 5 can be reduced.

In addition, since the rotation-linear motion converting unit 7 includes the linear motion transmission shaft 7D, the ball screw and the linear mover 11 are placed apart in the axial direction of the rotational axis S0, so that the ball screw can be located within the propellant-force generating motor 2 and the linear mover 11 can be enclosed in the hub 10.

Furthermore, since the racks and pinions are used as the linear-rotational conversion mechanism of the linear-rotational conversion unit 8, it is possible to align the longitudinal direction of each of the racks A1 to A3 along the linear motion direction of the linear mover 11 and to align the circle on which the pinions B1 to B3 are arranged with the circle on which the support shafts M1 to M3. Therefore, the arrangement of the three racks and three pinions can be smaller. As in the embodiment, three racks and three pinions are provided corresponding to three rotational blades H1 to H3, but the hub 10 can enclose the linear motion-rotation converting unit 8 while preventing the size of the hub 10 from being increased.

In the following, the configuration and operation of the rotation transmission unit 6 and the rotation-linear motion converting unit 7 will be described in more detail.

Figure 8A:
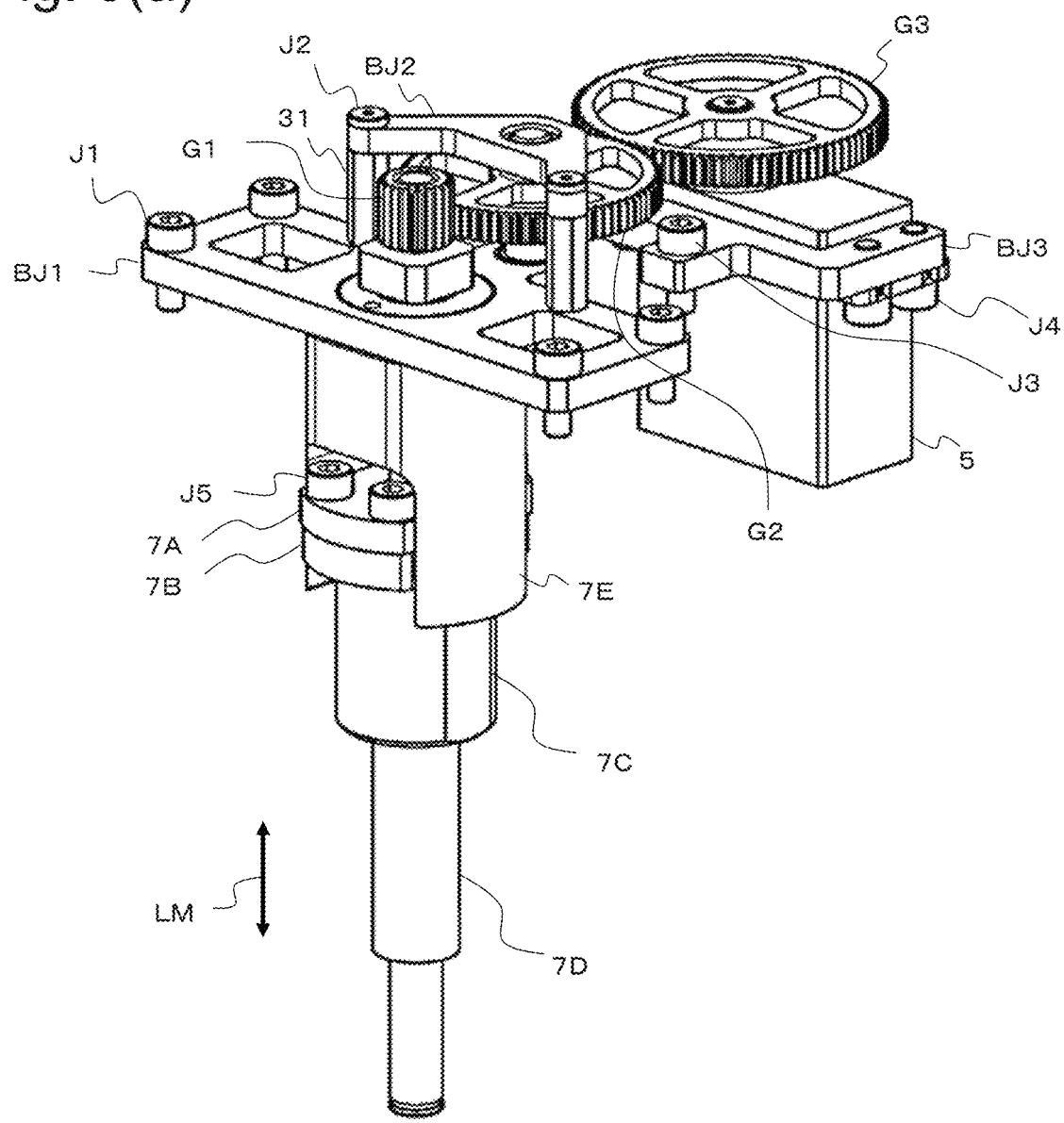
FIG. 8(a) is a perspective view showing the configuration of a pitch varying motor, a rotation transmission unit, and a rotation-linear motion converting unit in FIG. 6.
Figure 8B:
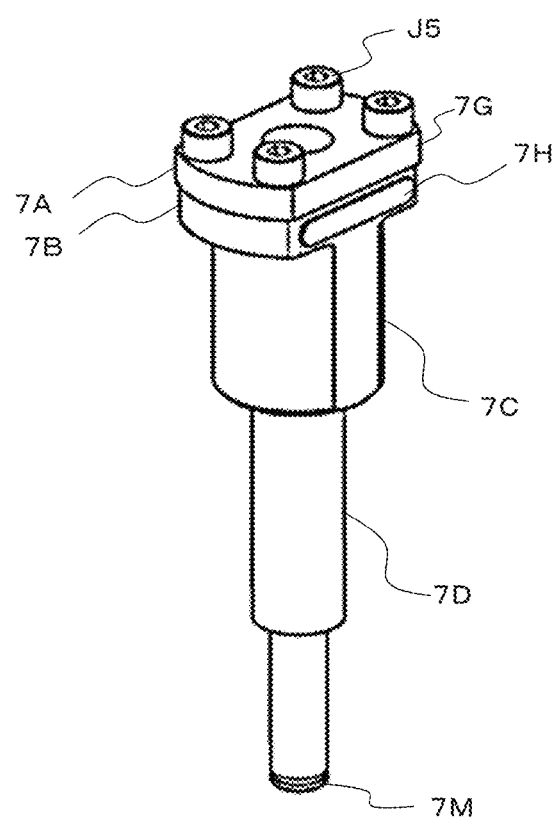
FIG. 8(b) is a perspective view showing the configuration of FIG. 8(a) without support members that support the rotation-linear motion converting unit and a linear motion guide.
Figure 9:
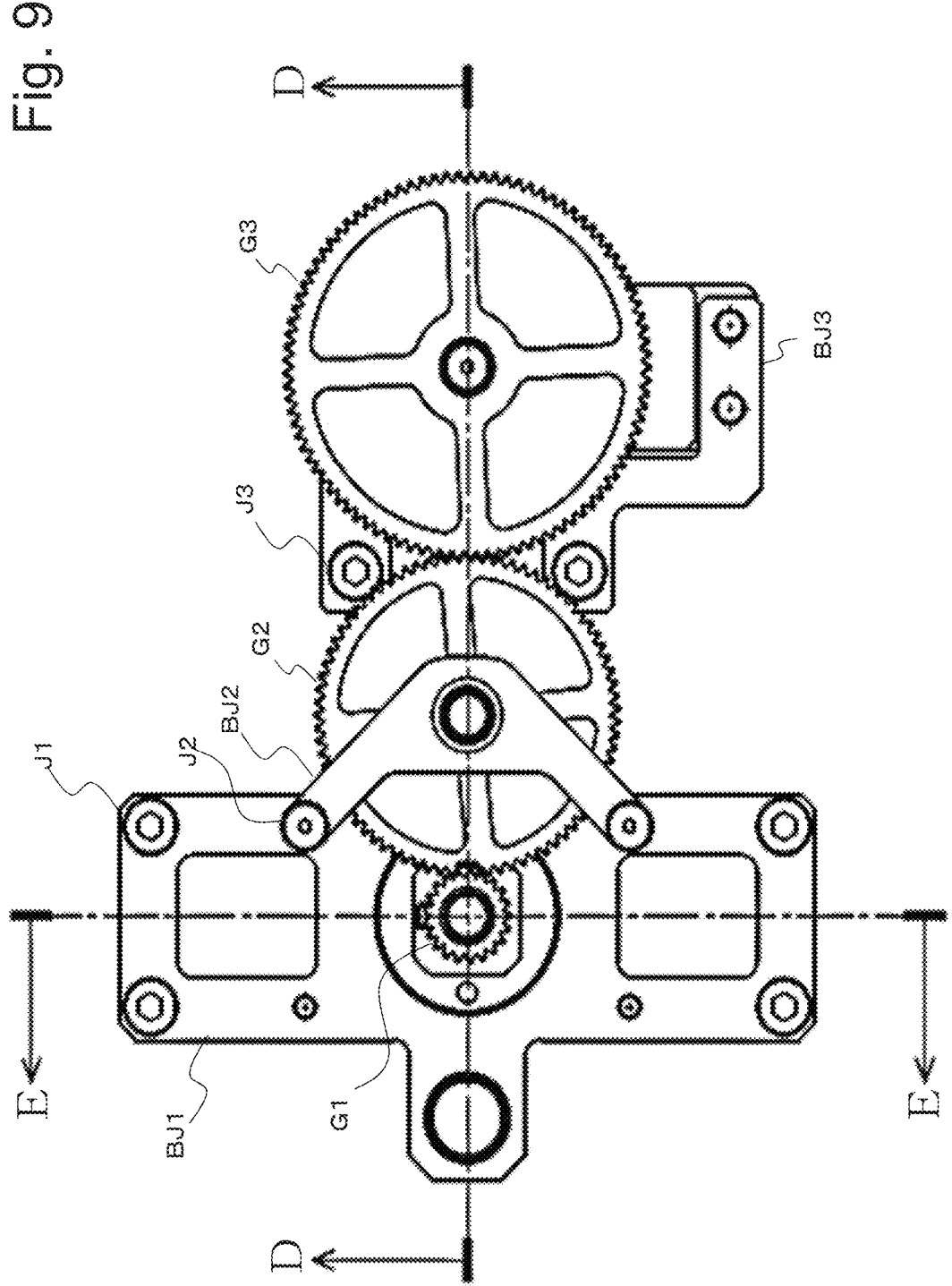
FIG. 9 is a plan view of the configuration of the pitch varying motor, the rotation transmission unit, and the rotation-linear motion converting unit in FIG. 8(a).

FIG. 8(a) is a perspective view showing the configuration of the pitch varying motor, the rotation transmission unit, and the rotation-linear motion converting unit in FIG. 6. FIG. 8(b) is a perspective view showing the configuration of FIG. 8(a) without support members that support the rotation-linear motion converting unit and the linear motion guide. FIG. 9 is a plan view of the configuration of the pitch varying motor, the rotation transmission unit, and the rotation-linear motion converting unit in FIG. 8(a). FIG. 10(a) is a cross-sectional view taken along line D-D in FIG. 9. FIG. 10(b) is a cross-sectional view taken along line E-E in FIG. 9.

As shown in FIG. 8(a), FIG. 8(b), FIG. 9, FIG. 10(a) and FIG. 10(b), the support member BJ1 can be fixed to the outer frame 2C, which is one of stationary members of the propellant-force generating motor 2, by bolts J1. The bolts J1 can be placed, for example, at the four corners of the support member BJ1. The support member BJ2 is fixed to the support member BJ1 by bolts J2 and pillars 31 in such a manner that the gear G2 is sandwiched between the support member BJ1 and the support member BJ2. The bolts J2 can be placed, for example, at both ends of the support member BJ2. Both ends of the shaft of the gear G2 are rotatably supported by the supporting members BJ1 and BJ2 via bearings. The support members BJ3 can be fixed to the outer frame 2C by bolts J3. For example, the bolts J3 can be placed at two locations at each end of the supporting member BJ3. In addition, the pitch varying motor 5 can be fixed to the supporting member BJ3 via bolts J4.

The ball screw nut 7G includes a flange 7A. The flange 7A has a shape of a cylinder cut along two parallel planes, and the flange 7A is placed in an opening of the linear motion guide 7E. The flange 7A can be formed integrally with the ball screw nut 7G.

The linear motion transmission shaft 7D includes a flange 7B and guide surfaces 7C. Each of the guiding surfaces 7C includes a sliding member 7H. The flange 7B has a shape of a cylinder cut along two parallel planes, and the flange 7B is placed in the opening of the linear motion guide 7E.

Flat surfaces of the flange 7B and the guiding surfaces 7C may be flush with each other. The flat surfaces may be two planes disposed in opposite directions. Protruding portions of the flanges 7A and 7B may include areas in which bolts J5 can be inserted. With the flanges 7A and 7B overlapping, the linear motion transmission shaft 7D can be fixed to the ball screw nut 7G by fixing the flange 7A to the flange 7B with the bolts J5.

The flat surfaces or the guiding surfaces 7C of the flange 7B can be provided with recesses into which the sliding members 7H can be inserted. The sliding members 7H can be inserted into the recesses and fixed to the flange 7B with an adhesive or the like. In this case, each sliding member 7H protrudes from the flat surface. The material of the sliding member 7H is, for example, a resin.

On the other hand, the inside of the linear motion guide 7E can be provided with flat surfaces that can face the flat surfaces of the flanges 7A and 7B and the guiding surfaces 7C. The sliding members 7H slide on the internal flat surfaces of the linear motion guide 7E along with the linear motion LM of the linear motion transmission shaft 7D, thereby restricting the motion of the linear motion transmission shaft 7D to a linear motion along the axial direction of the rotational axis S0.

In this embodiment, by providing the flat surfaces partially on the outer periphery of the flanges 7A and 7B and on the guiding surfaces 7C, and by providing the flanges 7A and 7B with protruding portions into which the bolts J5 can be inserted, and by placing the flanges 7A and 7B in the opening of the linear motion guide 7E, the outer diameter of the linear motion guide 7E can be reduced, and the rotation-linear motion converting unit 7 can be located within the rotor shaft 4 while preventing the diameter of the rotor shaft 4 from being increased.

In the following, the configuration and operation of the linear motion-rotation converting unit 8 will be described in more detail.

Figure 11:
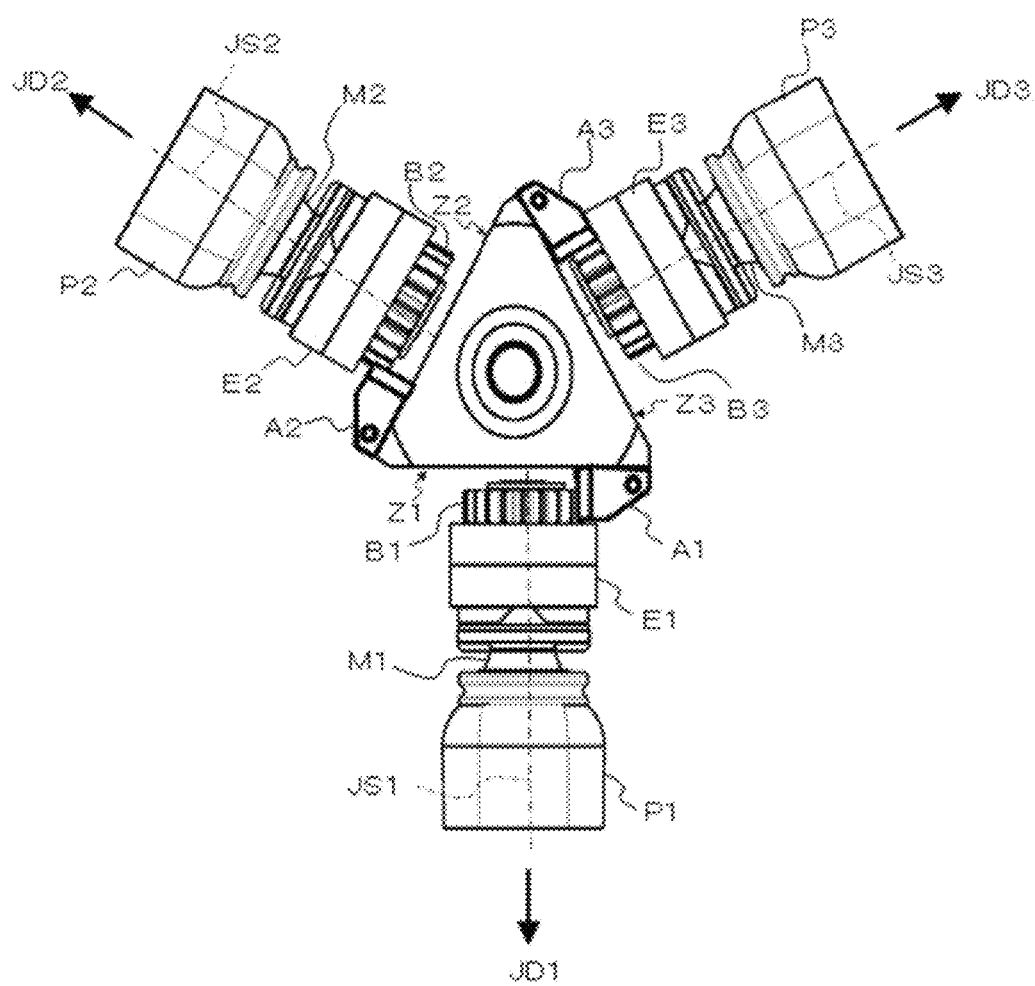
FIG. 11 is a top view showing the positional relationship among pinions and a linear mover to which racks are attached.
Figure 12A:
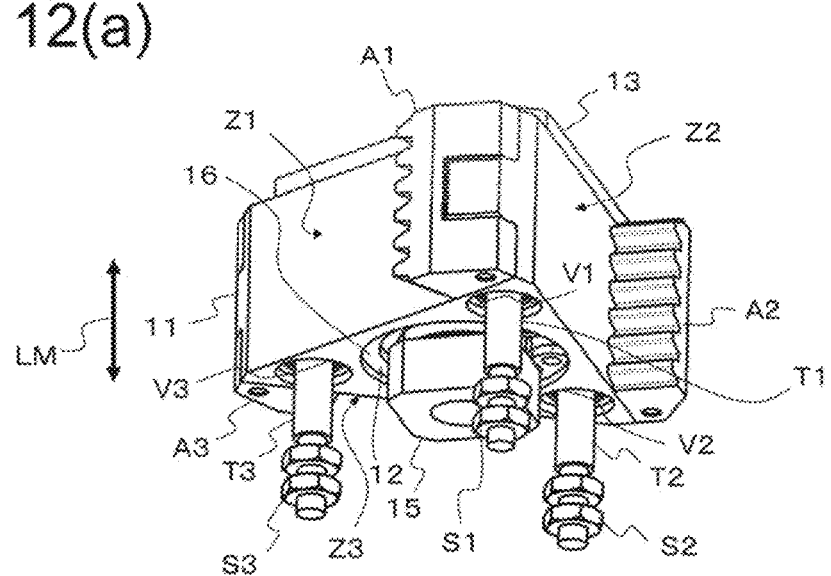
FIG. 12(a) is a perspective view showing a position of the linear mover corresponding to the pitch angle of the rotational blades in FIG. 1(b).
Figure 12B:
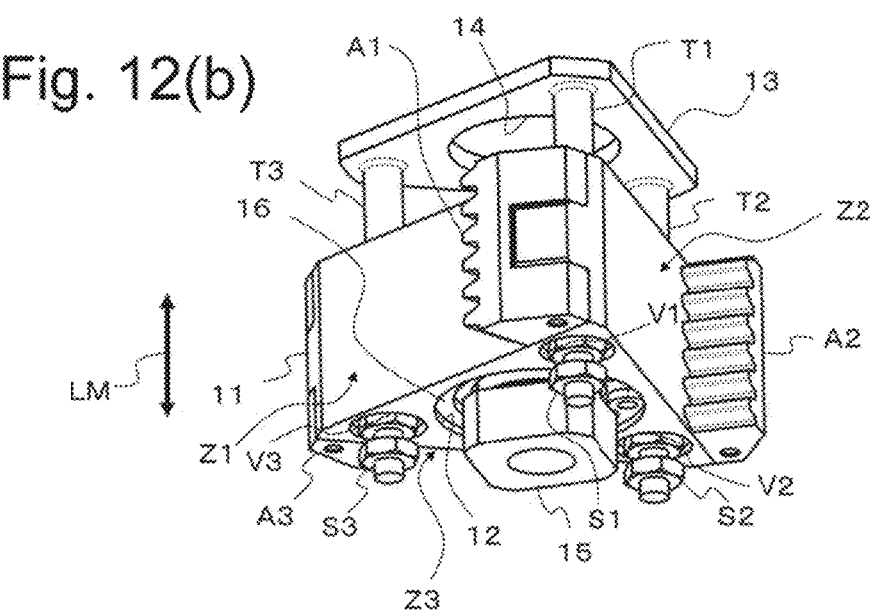
FIG. 12(b) is a perspective view showing a position of the linear mover corresponding to the pitch angle of the rotational blades in FIG. 1(c).
Figure 13:
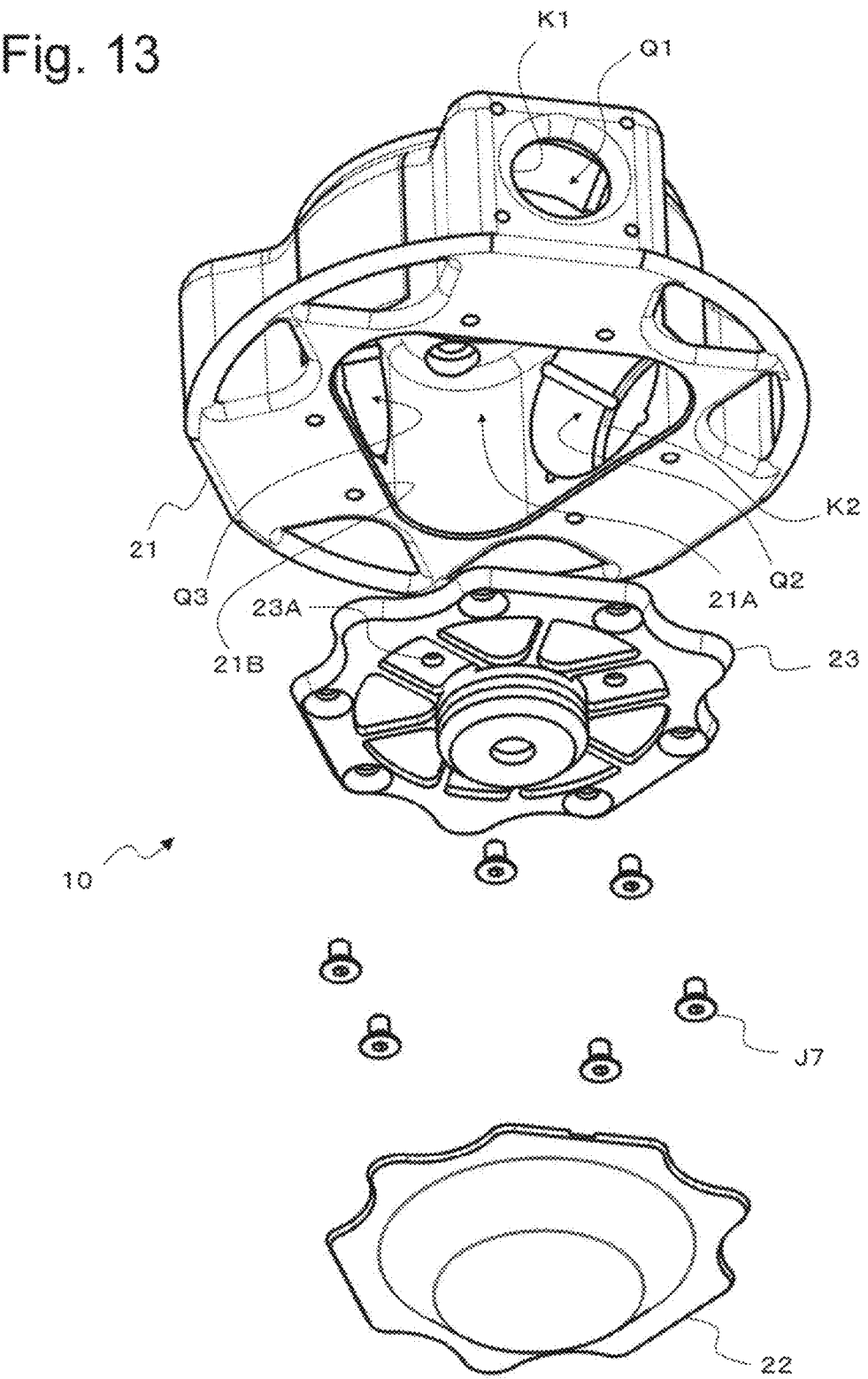
FIG. 13 is an exploded perspective view showing the configuration of a hub in FIG. 1(b).

FIG. 11 is a top view showing the positional relationship among the pinions and the linear mover to which racks are attached. FIG. 12(a) is a perspective view showing a position of the linear mover corresponding to the pitch angle of the rotational blades in FIG. 1(b). FIG. 12(b) is a perspective view showing a position of the linear mover corresponding to the pitch angle of the rotational blades in FIG. 1(c). FIG. 13 is an exploded perspective view showing the configuration of the hub in FIG. 1(b).

As shown in FIG. 11, FIG. 12(a), FIG. 12(b), and FIG. 13, the linear motion-rotation converting unit 8 includes a base 13, lift guides T1 to T3, and nuts S1 to S3 to limit the range of movement the linear mover 11 in the linear direction. The base 13 has an aperture 14 through which a distal end of the linear motion transmission shaft 7D can pass. The linear mover 11 has an opening 12, openings V1 to V3, and surfaces Z1 to Z3. The hub 10 includes the case 21, an outer lid 22 and a middle lid 23. The case 21 has a housing part 21A, hollow parts Q1 to Q3, an aperture 21B, and apertures K1 to K3. The middle lid 23 has through-holes 23A.

The surfaces Z1 to Z3 are provided at three rotational symmetric positions of the linear mover 11 around the rotational axis S0. Because of the three rotational symmetric positions, the profile of the linear mover 11 can be the same before and after rotation by 120 degrees around the rotational axis S0. The surfaces Z1 to Z3 can support racks A1 to A3, respectively. In this embodiment, the surfaces Z1 to Z3 support the racks A1 to A3 at positions at which the teeth of the racks A1 to A3 mesh the teeth of the pinions B1 to B3, respectively.

The bearing U3 is inserted in the aperture 12, and the linear motion transmission shaft 7D is inserted in the inner race of the bearing U3. The lift guides T1 to T3 can be inserted into the openings V1 to V3, respectively.

The linear mover 11 is supported by the outer race of the bearing U3, and the distal end of the linear motion transmission shaft 7D is fixed to the inner race of the bearing U3 by a nut 15. The outer race of the bearing U3 can be mounted to the linear mover 11 by means of, for example, a C-shaped retaining ring 16.

The base 13 supports the lift guides T1 to T3 in upright positions. The lift guides T1 to T3 can be formed integrally with the base 13. The shape of the base 13 in plan view can be the same as the that of the linear mover 11. The positions of the openings V1 to V3 can correspond to the positions of the lift guides T1 to T3.

The aperture 21B allows insertion of the linear mover 11, to which the racks A1 to A3 are attached, and the base 13 into the housing part 21A. Each of the apertures K1 to K3 allows insertion of one of the support shafts M1 to M3 into the case 21.

The housing part 21A encloses the linear mover 11, to which the racks A1 to A3 are attached, and the base 13. The housing part 21A is, for example, a hollow or a recess provided in the case 21. The shape of the housing part 21A in plan view can be the same as that of the base 13. Accordingly, the shape of the housing part 21A can be three-fold rotational symmetric around the rotational axis S0.

On the other hand, the apertures K1 to K3, through which the support shafts M1 to M3 can be inserted, can be arranged around the outer circumferential surface of the housing part 21A. The case 21 can be provided with a hollow part Q1 into which the support shaft M1, the pinion B1, the bearing E1, and the adapter D1 can be inserted, a hollow part Q2 into which the support shaft M2, the pinion B2, the bearing E2, and the adapter D2 can be inserted, and a hollow part Q3 into which the support shaft M3, the pinion B3, the bearing E3, and the adapter D3 can be inserted. Into the hollow parts Q1 to Q3, the support shafts M1 to M3, the pinions B1 to B3, the bearings E1 to E3, and the adapters D1 to D3 can be inserted respectively from the aperture 21B.

Distal ends of the lift guides T1 to T3 project to the outside of the middle lid 23 through the through-holes 23A. The nuts S1 to S3 are mounted to the distal ends of the lift guides T1 to T3 protruding outwardly from the middle lid 23, so that the base 13 can be fixed within the housing part 21A.

The middle lid 23 is supported by the case 21. The middle lid 23 can be fixed to the case 21 by bolts J7. The outer lid 22 covers the middle lid 23. The outer lid 22 can be fixed to the middle lid 23. The material of the middle lid 23 is, for example, duralumin, and the material of the outer lid 22 is, for example, a resin.

The linear mover 11, to which the racks A1 to A3 are attached, is located within the housing part 21A. The support shafts M1 to M3, to which the pinions B1 to B3 are attached, are located within the hollow parts Q1 to Q3. As shown in FIG. 11, the support shafts M1 to M3 are arranged so that their rotational axes JS1 to JS3 are directed in perpendicular directions JD1 to JD3 relative to the surfaces Z1 to Z3 of the linear mover 11. The racks A1 to A3 are supported on the surfaces Z1 to Z3 at positions at which they engage with the pinions B1 to B3, respectively.

When the linear motion transmission shaft 7D linearly moves, each of the racks A1 to A3 moves linearly along with the linear mover 11. The motion of the linear mover 11 is guided by the lift guides T1 to T3 and the range of linear motion of the linear mover 11 is limited by the base 13 and the nuts S1 to S3. The linear motion of the racks A1 to A3 causes the pinions B1 to B3 to rotate, and the rotations of the pinions B1 to B3 cause the support shafts M1 to M3 to rotate about their respective axes. The rotations of the support shafts M1 to M3 causes rotations of the rotational blades H1 to H3 to change the pitch angles θ1 to θ3 of the rotational blades H1 to H3. For example, when the linear mover 11 is in the position of FIG. 12(a), the pitch angles θ1 to θ3 of the rotational blades H1 to H3 are set as shown in FIG. 1(b), and when the linear mover 11 is in the position of FIG. 12(b), the pitch angles θ1 to θ3 of the rotational blades H1 to H3 are set as shown in FIG. 1(c).

By forming the surfaces Z1 to Z3 at three-fold rotational symmetric positions around the rotational axis S0 and arranging racks A1 to A3 on the surfaces Z1 to Z3, the linear motion of the single linear mover 11 can generate three rotational motions around the axes of the three support axes M1 to M3. Therefore, the pitch angles of the three rotational blades H1 to H3 can be made variable whereas the linear motion-rotation converting unit 8 can be located within the hub 10.

Hereinafter, a propellant force generator according to a second embodiment will be described. In the first embodiment described above, the extension 9 having the flange 9A is used as a spacer to maintain the distance between the propellant-force generating motor 2 and the rotational blades H1 to H3. In the second embodiment, another extension 9' without a flange 9A is used as a spacer to maintain the distance between the propellant-force generating motor 2 and the rotational blades H1 to H3.

In the following description, the same reference symbols are used for identifying the same parts as in the first embodiment, and the detailed description thereof will be omitted.

Figure 14A:
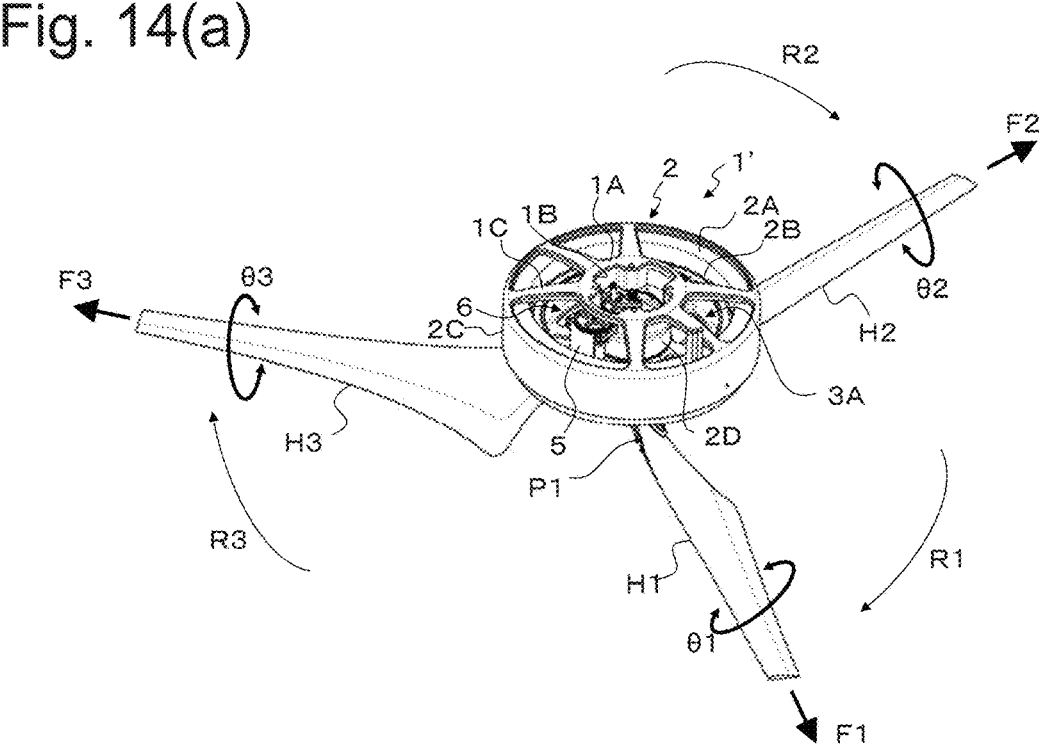
FIG. 14(a) is a perspective view of a propellant force generator according to a second embodiment to which rotational blades are attached.
Figure 14B:
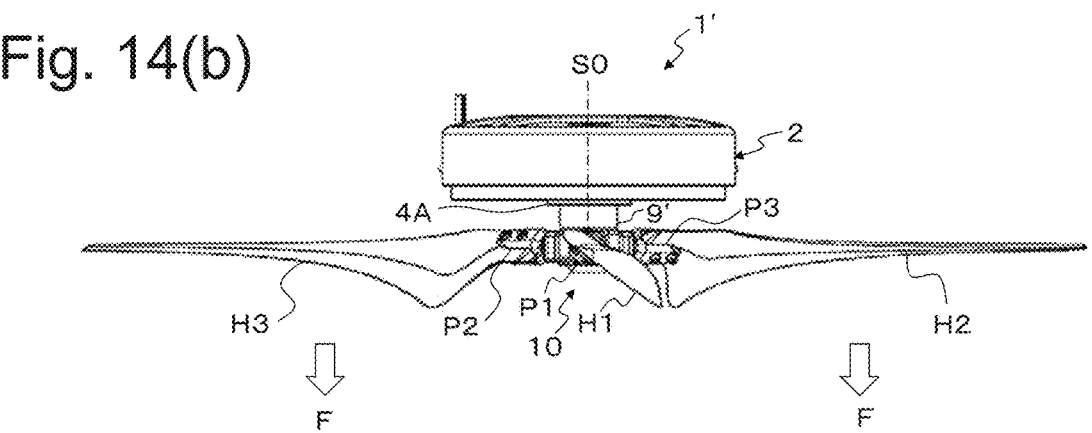
FIG. 14(b) and FIG. 14(c) are side views of the rotational blades attached to the propellant force generator according to the second embodiment in which the pitch angles of the rotational blades are varied.
Figure 14C:
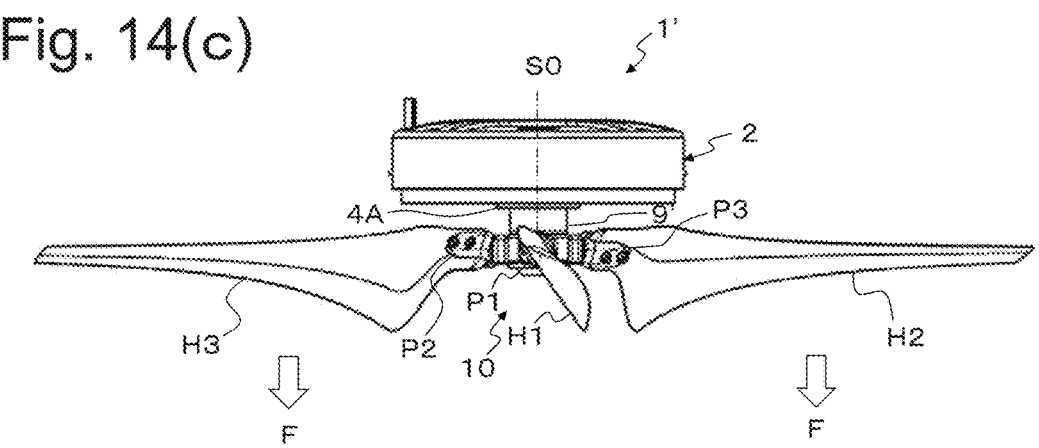
Figure 15:
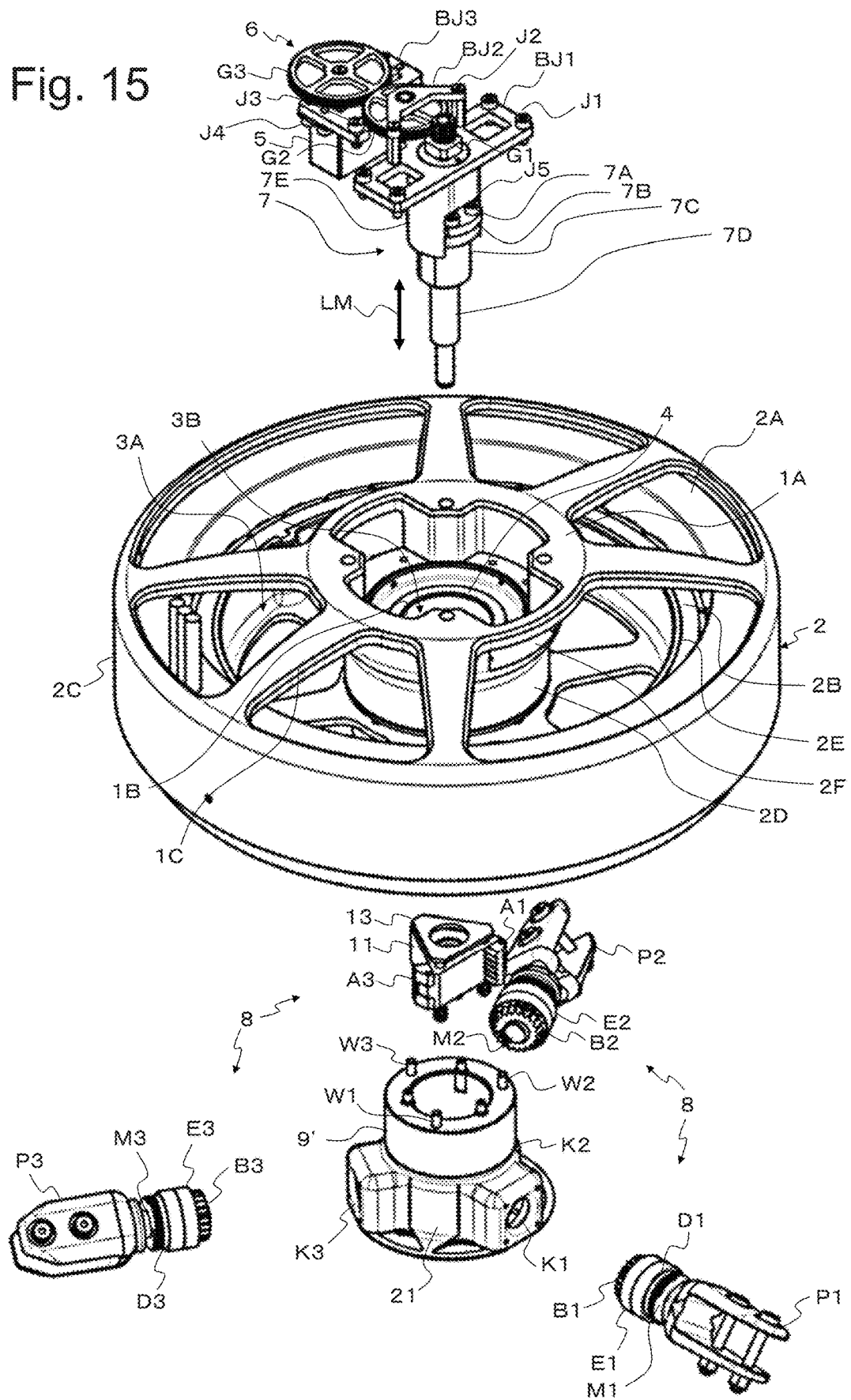
FIG. 15 is an exploded perspective view of the propellant force generator in FIG. 14(a) viewed from one side for the rotational shaft.
Figure 16:
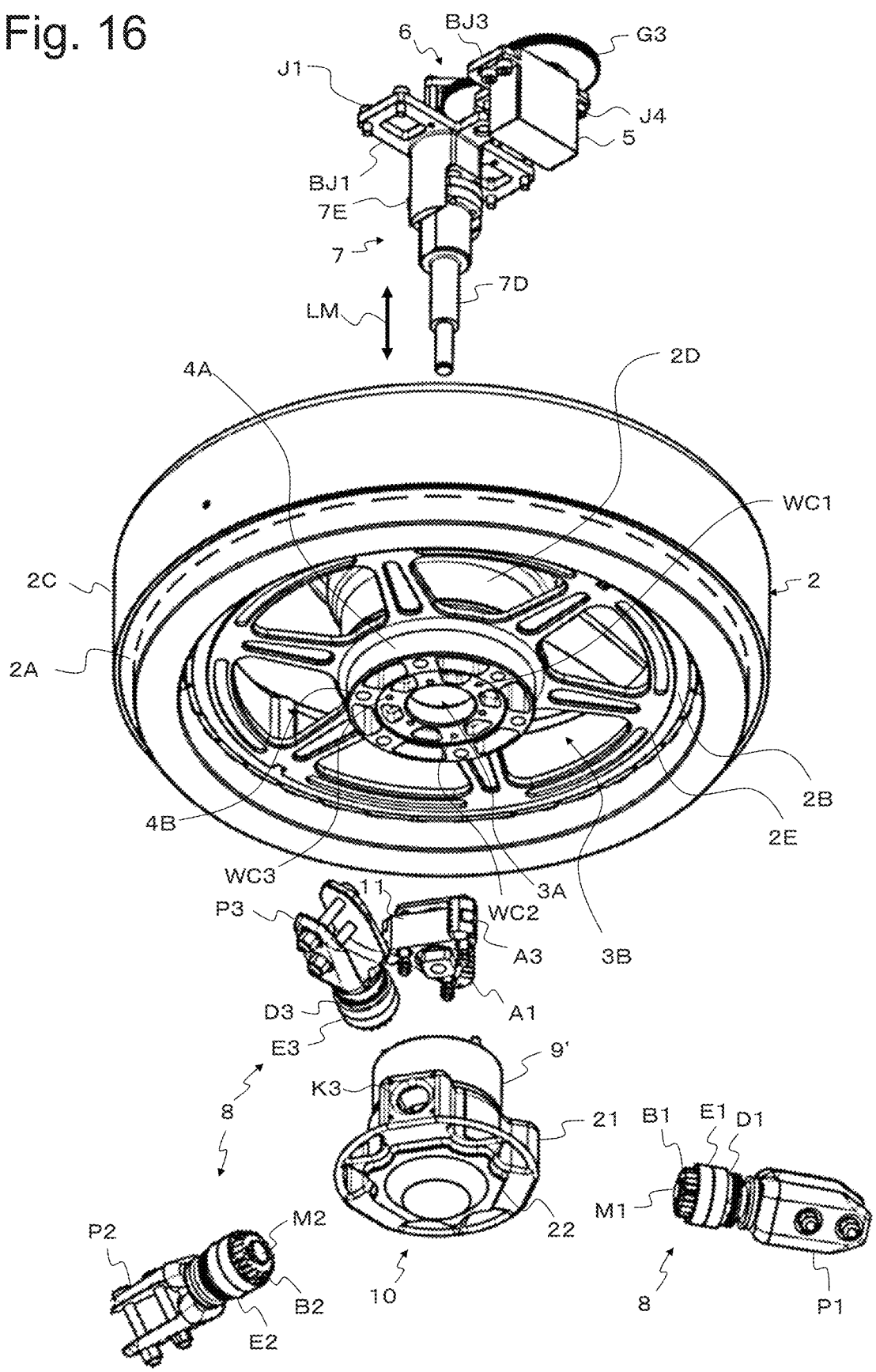
FIG. 16 is an exploded perspective view of the propellant force generator in FIG. 14(a) viewed from another side for the rotational shaft.
Figure 17A:
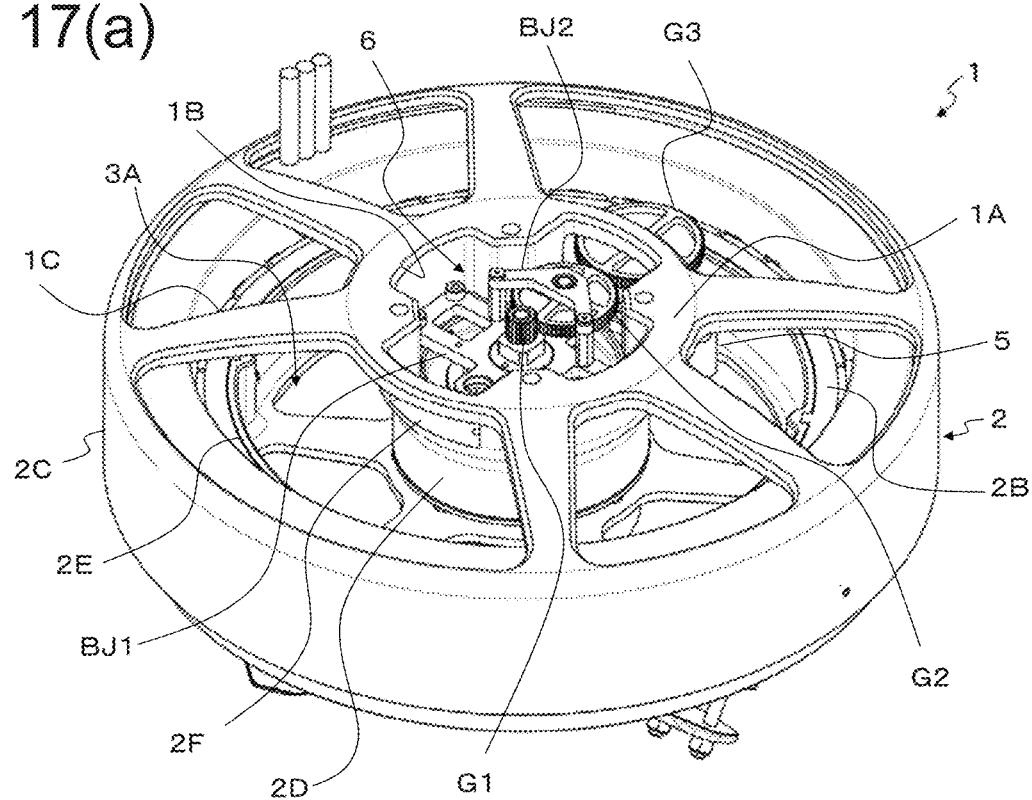
FIG. 17(a) is a perspective view showing the configuration of the propellant force generator corresponding to FIG. 15 after assembly.
Figure 17B:
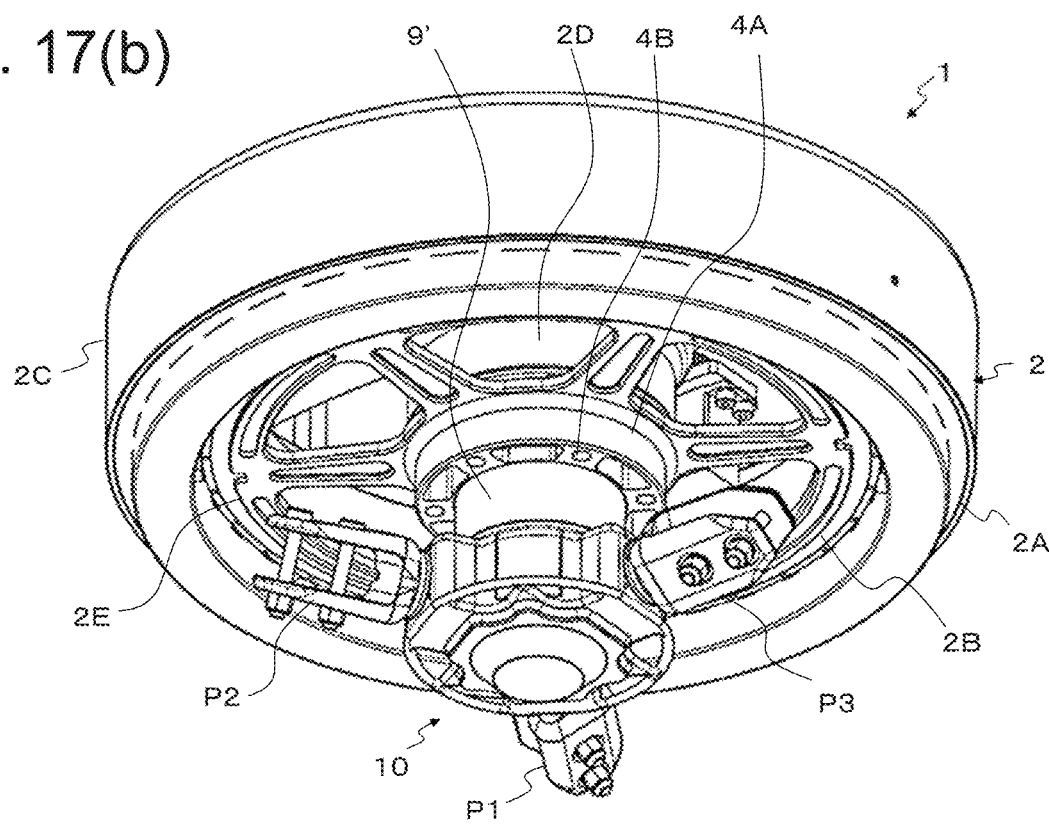
FIG. 17(b) is a perspective view showing the configuration of the propellant force generator corresponding to FIG. 16 after assembly.
Figure 18A:
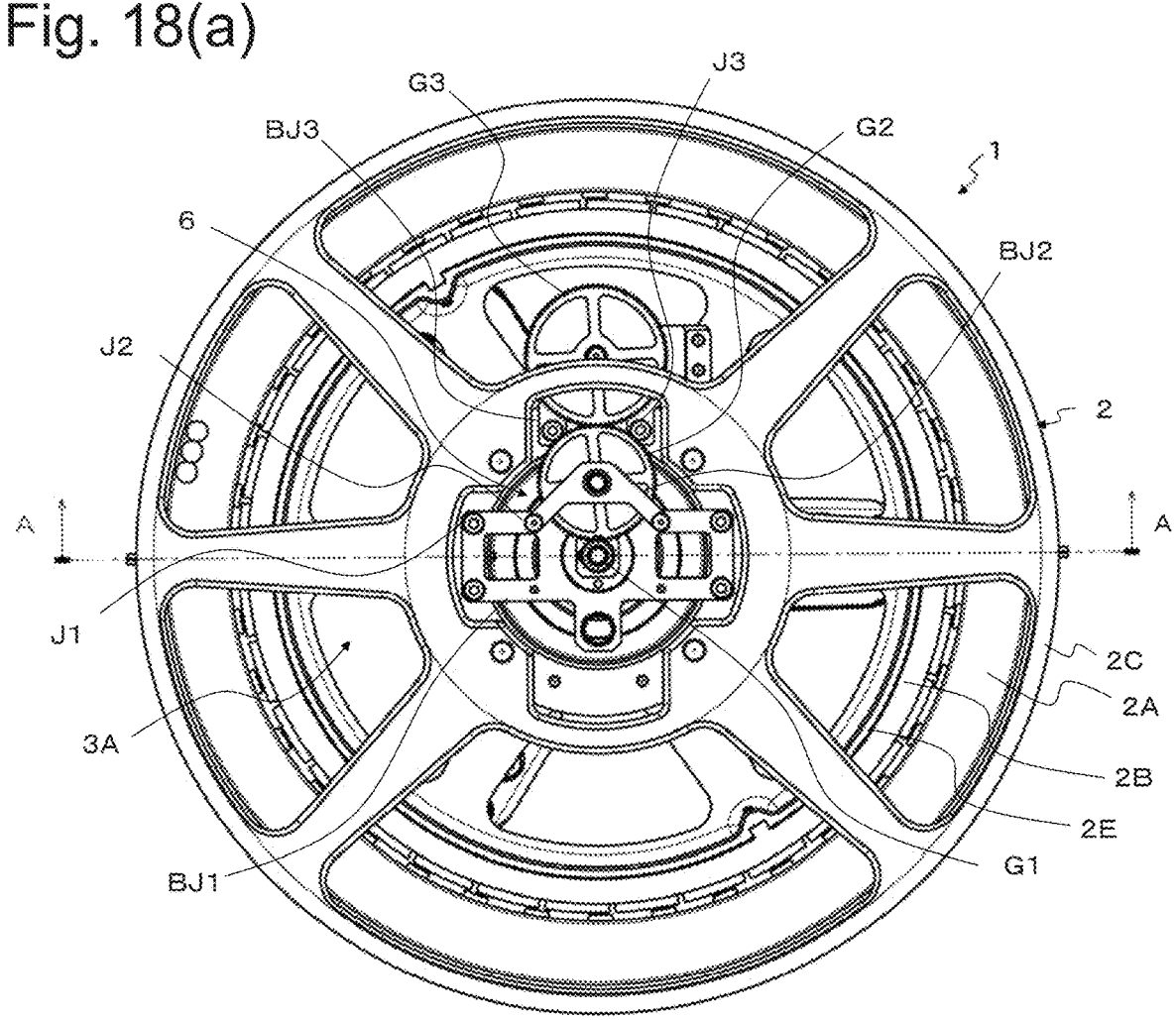
FIG. 18(a) is a plan view showing the configuration of the propellant force generator according to the second embodiment.
Figure 18B:
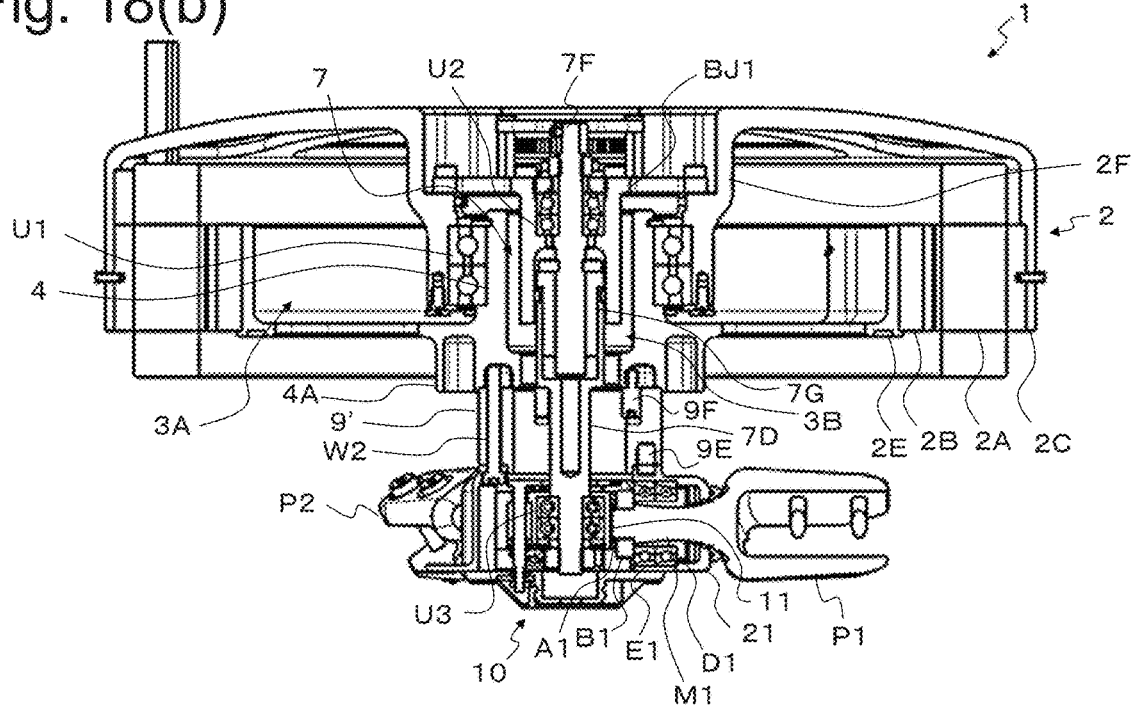
FIG. 18(b) is a cross-sectional view taken along line A-A in FIG. 18(a).
Figure 19A:
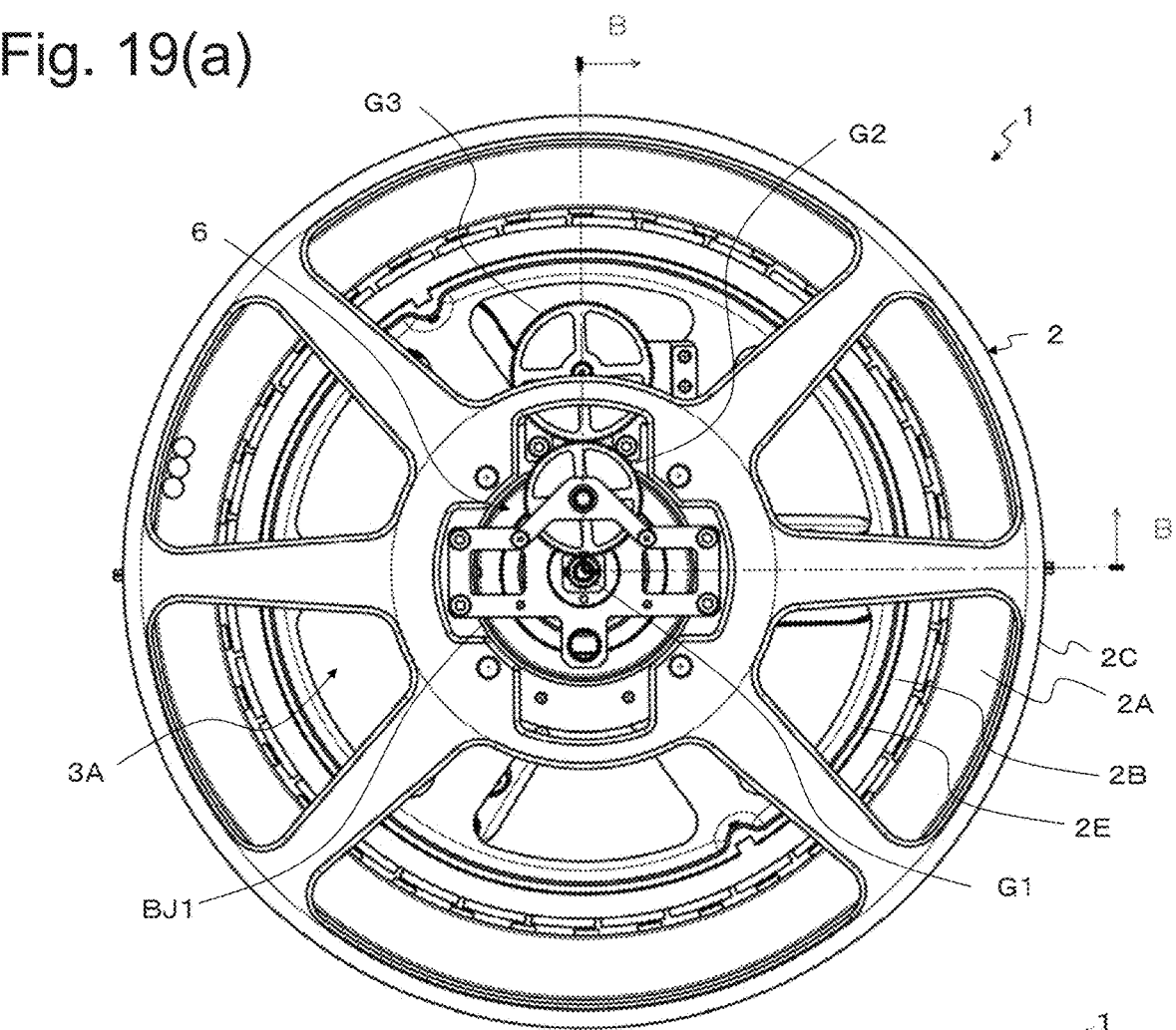
FIG. 19(a) is a plan view showing the configuration of the propellant force generator according to the second embodiment.
Figure 19B:
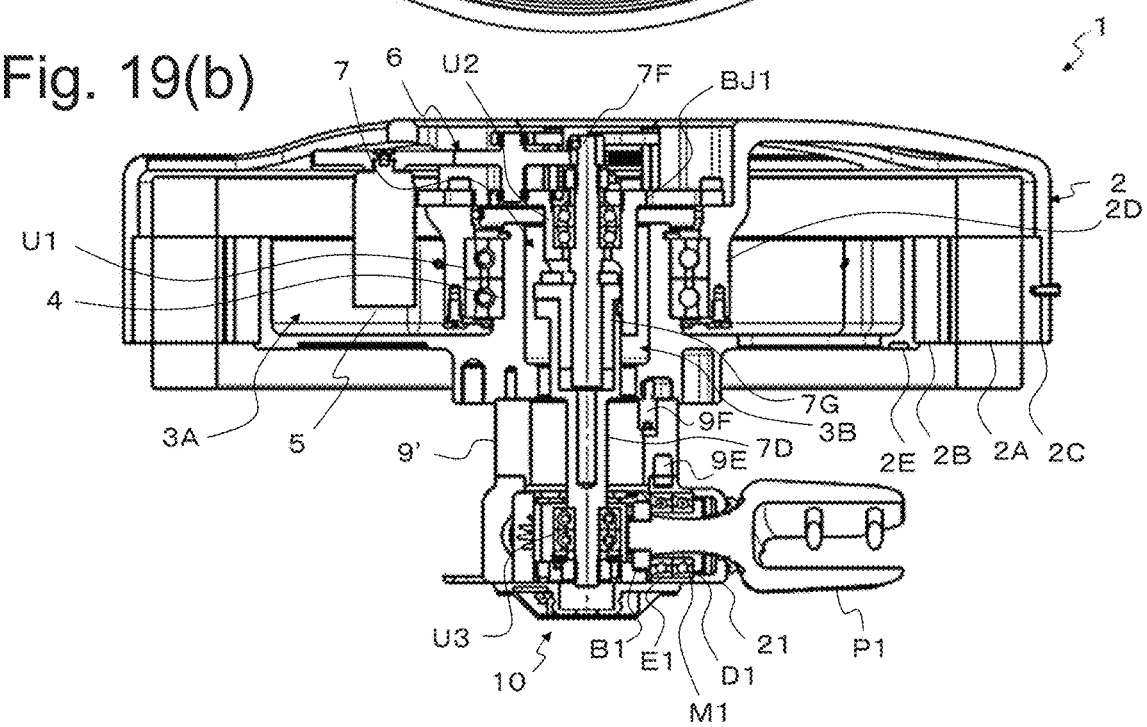
FIG. 19(b) is a cross-sectional view taken along line B-B in FIG. 19(a).

FIG. 14(a) is a perspective view of a propellant force generator according to the second embodiment to which rotational blades are attached. FIG. 14(b) and FIG. 14(c) are side views of the rotational blades attached to the propellant force generator according to the second embodiment in which the pitch angles of the rotational blades are varied. FIGS. 15 and 16 are exploded perspective views of the propellant force generator in FIG. 14(a). FIGS. 17(a) and 17(b) are perspective view showing the configuration of the propellant force generator corresponding to FIGS. 15 and 16 after assembly. FIGS. 18(a) and 19(a) are plan views showing the configuration of the propellant force generator according to the second embodiment. FIG. 18(b) is a cross-sectional view taken along line A-A in FIG. 18(a). FIG. 19(b) is a cross-sectional view taken along line B-B in FIG. 19(a).

As shown in FIG. 14(a), FIG. 14(b), FIG. 14(c), FIG. 15, FIG. 16, FIG. 17(a), FIG. 17(b), FIG. 18(a), FIG. 18(b), FIG. 19(a), and FIG. 19(b), the propellant force generator 1' includes an extension 9' instead of the extension 9 of the propellant force generator 1 in FIG. 1(b). The configuration of the propellant force generator 1' is the same as that of the propellant force generator 1 in FIG. 1(b) except for the extension 9'.

The extension 9' is a spacer that maintains the distance between the propellant-force generating motor 2 and the rotational blades H1 to H3 in the axial direction of the rotational axis S0. The extension 9' prevents the rotational blades H1 to H3 from colliding with the propellant-force generating motor 2. The extension 9' is fixed to the rotor shaft 4 via the mounting part 4A, and rotates together with the rotor shaft 4. The hub 10 is fixed to the rotor shaft 4 via the extension 9'. The extension 9' can be a cylindrical pipe through which a linear motion transmission shaft 7D passes in the axial direction of the rotor shaft 4. The extension 9' can be constructed in the same way as the extension 9 in FIG. 2, except that the flange 9A is absent.

In the following, a method of mounting the hub 10 to the end face of the rotor shaft 4 via the extension 9' will be described in detail.

Figure 21:
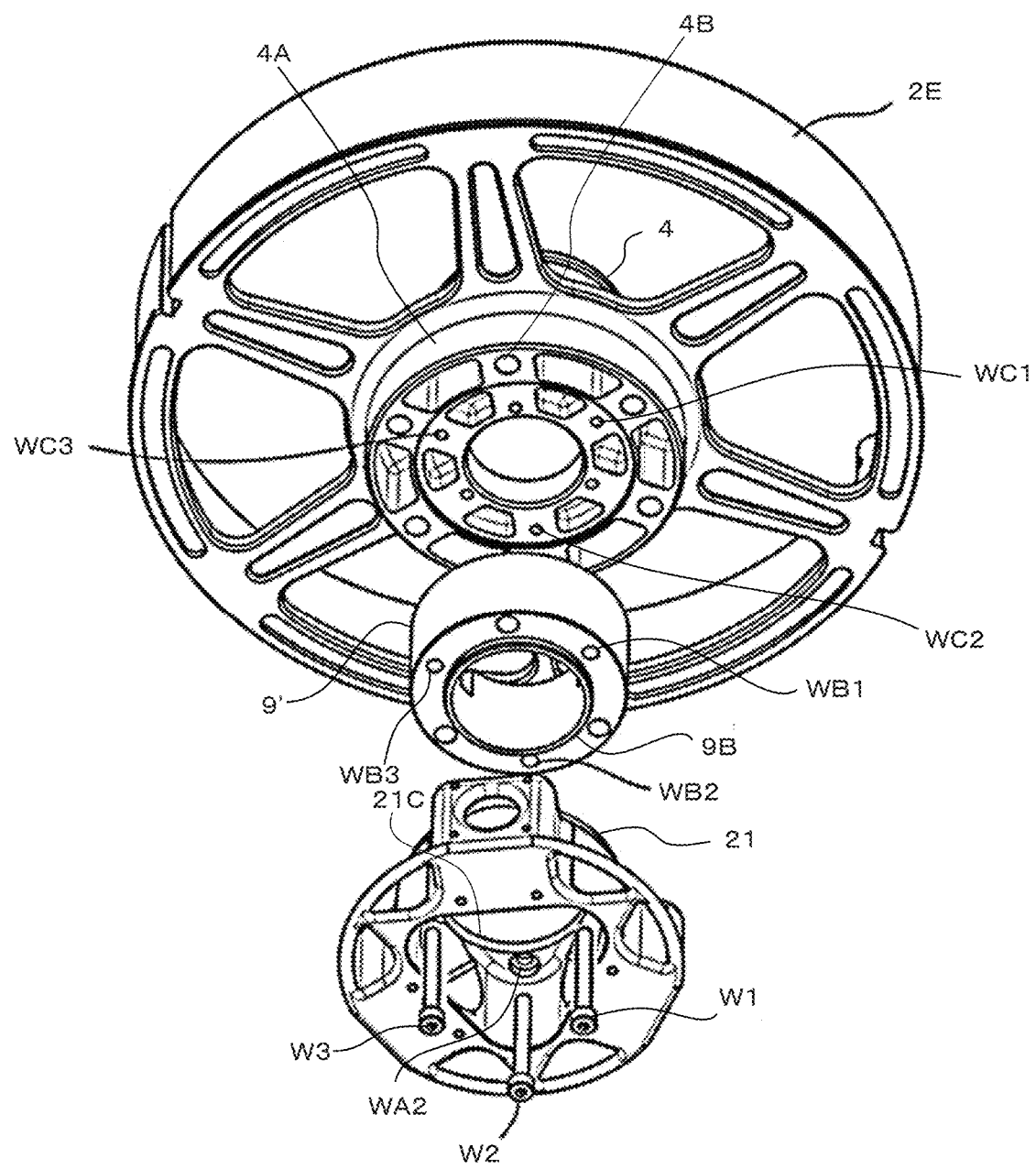
FIG. 21 is an exploded perspective view of a mounting part, a case, and the extension in FIG. 14(b).
Figure 22:
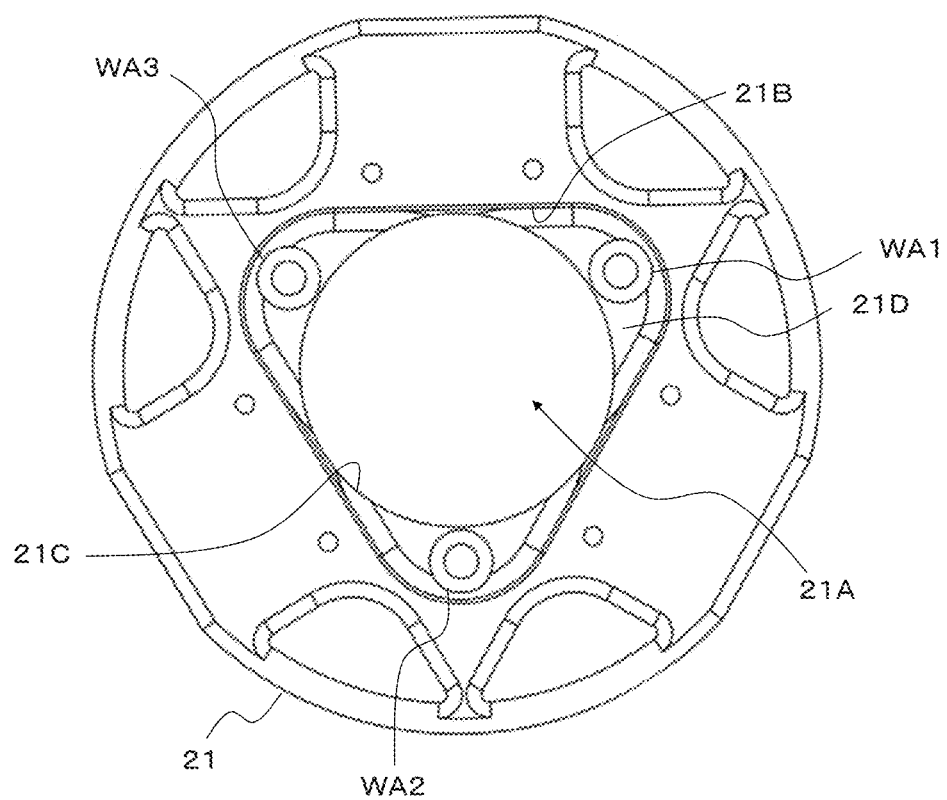
FIG. 22 is a bottom view showing the configuration of the case of FIG. 21.

FIG. 20 is an exploded perspective view of the hub and the extension in FIG. 14(b). FIG. 21 is an exploded perspective view of the mounting part, the case, and the extension in FIG. 14(b). FIG. 22 is a bottom view showing the configuration of the case of FIG. 21.

As shown in FIG. 20 to FIG. 22, the housing part 21A of the case 21 has a top wall 21D. The top wall 21D is located on the side on which the extension 9' is mounted. The top wall 21D includes a circular opening 21C and through-holes WA1 to WA3. The through-holes WA1 to WA3 can be located at three positions around the opening 21C. The through-holes WA1 to WA3 can be used for insertion of bolts W1 to W3. The extension 9' has a step 9B and through-holes WB1 to WB3. The step 9B is arranged near the inner surface of the extension 9' and protrudes in the axial direction of the rotor shaft 4. The step 9B can be inserted into the opening 21C. The through-holes WB1 to WB3 penetrate the extension 9' in the axial direction of the rotor shaft 4. The bolts W1 to W3 can be inserted into the through-holes WB1 to WB3. The mounting part 4A has female screws WC1 to WC3. The female screws WC1 to WC3 are located on the side of the mounting surface of the extension 9'. The through-holes WA1 to WA3, WB1 to WB3, and the female screws WC1 to WC3 can be arranged to correspond to the insertion position of the bolts W1 to W3. The middle lid 23 has through-holes 23D through which screws J7 can be inserted. The outer lid 22 can cover the middle lid 23 so as to block the through-holes 23D.

In this structure, the step 9B is inserted into the opening 21C until the top wall 21D of the case 21 is butted against the lower end of the extension 9'. Then, the bolts W1 to W3 are inserted into the housing part 21A and through the through-holes WA1 to WA3, respectively, so that the bolts W1 to W3 protrude from the extension 9'. Then, the bolts W1 to W3 are screwed onto the female screws WC1 to WC3, so that the case 21 and the extension 9' can be fixed to the mounting part 4A. Accordingly, the case 21 and the extension 9' can be fixed to the mounting part 4A while the bolts W1 to W3 are contained within the case 21 and the extension 9'. This makes it possible to prevent the bolts W1 to W3 from being exposed to the outside of the propellant force generator 1' and to prevent the bolts W1 to W3 from falling out of the propellant force generator 1' while reducing the weight of the propellant force generator 1' of FIG. 14(a) compared with the propellant force generator 1 of FIG. 1(a).

As shown in FIG. 20, knock pins 9E can be inserted into holes on facing surfaces of the case 21 and the extension 9', and marker pins 9F can be inserted into holes on facing surfaces of the mounting part 4A and the extension 9'. There can be three knock pins 9E and three marker pins 9F in accordance with the number of bolts W1 to W3. In this embodiment, the knock pins 9E and the bolts W1 to W3 can be arranged alternately in a circumferential direction on the lower end face of the extension 9'. In addition, the marker pin 9F and the bolts W1 to W3 can be arranged alternately in a circumferential direction at the mounting part 4A. The knock pins 9E and the marker pins 9F ensures a clearance between the case 21 and the extension 9' and a clearance between the mounting part 4A and the extension 9' for screwing the case 21 and the extension 9' onto the mounting part 4A so that the positioning accuracy of the case 21 and the extension 9' can be improved. The knock pins 9E and the marker pins 9F contribute to releasing the circumferential torque applied to the bolts W1 to W3.

Then, in a manner that the linear mover 11, the racks A1 to A3, and the pinions B1 to B3 are arranged in the housing part 21A, the middle lid 23 is attached to the case 21 so as to block the aperture 21B. Then, with the screws J7 inserted into the through-holes 23D, the middle lid 23 is fixed to the case 21 by screwing the screws J7 into the case 21. Then, the outer lid 22 is attached to the middle lid 23 so as to block the through-holes 23D, into which the screws J7 are inserted. This makes it possible to prevent the screws J7 from being exposed to the outside of the propellant force generator 1' and to prevent the screws J7 from falling out.

The case 21 and the mounting part 4A are common to the propellant force generator 1 in FIG. 1(b) and the propellant force generator 1 in FIG. 14(b). Therefore, when the extension 9' in FIG. 15 does not have sufficient strength, it can be replaced with the extension 9 in FIG. 2 without modifying the case 21 and the mounting part 4A.

In the above embodiments, the rotational blades H1-H3 are disposed directly below the propellant force generator 1 and the propellant force generator 1 is mounted on a lower part of the fuselage of a flying object, but rotational blades H1-H3 may be disposed directly above the propellant force generator 1 and the propellant force generator 1 may be mounted an upper part of the fuselage of a flying vehicle.

In the above embodiments, the extension 9 in FIG. 1(b) and the extension 9' in FIG. 14(b) are provided to maintain the distance between the propellant force generator motor 2 and the rotational blades H1 to H3. However, if the distance between the propellant-force generating motor 2 and the rotational blades H1 to H3 can be maintained sufficiently even without the extensions 9 or 9', the extensions 9 or 9' may be omitted. If there is no extension 9 in FIG. 1(b), the flange 9A may be provided on the case 21. If there is no extension 9' in FIG. 14(b), the bolts W1 to W3 can be shortened by the length of the extension 9', and the case 21 can be directly fixed to the mounting part 4A using the bolts W1 to W3.

The invention claimed is:

1. A propellant force generator comprising:
a first motor adapted to generate a propellant force for rotational blades;
a second motor adapted to generate a rotational motion for changing pitch angles of the rotational blades;
a first converting unit adapted to convert the rotational motion generated by the second motor into a linear motion; and
a second converting unit adapted to convert the linear motion converted by the first converting unit into rotational motions, wherein the second converting unit comprises:
a linear mover comprising N surfaces corresponding to N rotational blades, N being a positive integer, the linear mover moving linearly in accordance with the linear motion converted by the first converting unit; and
N racks and N pinions corresponding to the N rotational blades,
wherein the N racks of the N racks and N pinions are supported by the N surfaces, respectively, and
the N pinions of the N racks and N pinions are supported on sides of support shafts for the N rotational blades, respectively.

2. A propellant force generator comprising:
a first motor adapted to generate a propellant force for rotational blades;
a second motor adapted to generate a rotational motion for changing pitch angles of the rotational blades;
a first converting unit adapted to convert the rotational motion generated by the second motor into a linear motion; and
a second converting unit adapted to convert the linear motion converted by the first converting unit into rotational motions,
wherein the first converting unit comprises a ball screw, and
wherein the first motor comprises a stator and a rotor, the ball screw comprising a ball screw shaft and a ball screw nut, the ball screw shaft being rotatably supported by a stationary member of the first motor, the ball screw nut being screwed to the ball screw shaft via balls and being guided to move linearly along the rotational axis.

3. The propellant force generator according to claim 2, further comprising a linear motion transmission shaft adapted to transmit the linear motion converted by the first converting unit to the second converting unit, the linear motion transmission shaft being fixed to the ball screw nut of the ball screw, the linear motion transmission shaft comprising a surface adapted to restrict motion of the linear motion transmission shaft to a linear motion along a direction of the linear motion.

4. A propellant force generator comprising:
a first motor adapted to generate a propellant force for rotational blades;
a second motor adapted to generate a rotational motion for changing pitch angles of the rotational blades;
a first converting unit adapted to convert the rotational motion generated by the second motor into a linear motion; and
a second converting unit adapted to convert the linear motion converted by the first converting unit into rotational motions,
wherein the first motor comprises a stator and a rotor disposed inside the stator, and wherein at least a part of the first converting unit is located within the rotor of the first motor.

5. The propellant force generator according to claim 4, wherein the rotor is fixed to a rotational shaft having a hollow section extending along an axial direction of the rotational shaft, and the part of the first converting unit that is located within the first motor is located within the hollow section.

6. The propellant force generator according to claim 5, wherein the second motor is fixed to a part that is fixed to the stator.

7. The propellant force generator according to claim 4, wherein the second motor is fixed to a part that is fixed to the stator.

* * * * *